(12) United States Patent
Van Ee

(10) Patent No.: US 11,761,206 B2
(45) Date of Patent: Sep. 19, 2023

(54) MEGAMODULE PANEL SYSTEM

(71) Applicant: Jonathan Hendrik Van Ee, Dublin, CA (US)

(72) Inventor: Jonathan Hendrik Van Ee, Dublin, CA (US)

( * ) Notice: Subject to any disclaimer, the term of this patent is extended or adjusted under 35 U.S.C. 154(b) by 10 days.

(21) Appl. No.: 17/305,447

(22) Filed: Jul. 7, 2021

(65) Prior Publication Data
US 2022/0042308 A1 Feb. 10, 2022

Related U.S. Application Data

(60) Provisional application No. 62/706,230, filed on Aug. 6, 2020.

(51) Int. Cl.
| E04C 2/40 | (2006.01) |
| E04B 2/00 | (2006.01) |
| B62D 27/06 | (2006.01) |
| A47B 5/02 | (2006.01) |
| A47C 4/02 | (2006.01) |
| B60N 2/005 | (2006.01) |
| E04C 2/00 | (2006.01) |

(52) U.S. Cl.
CPC .............. *E04C 2/46* (2013.01); *A47B 5/02* (2013.01); *A47C 4/02* (2013.01); *B60N 2/005* (2013.01); *B62D 27/06* (2013.01); *E04C 2002/004* (2013.01)

(58) Field of Classification Search
CPC .. A47B 5/02; A47C 4/02; B60N 2/005; B62D 27/06; E04C 2/46; E04C 2002/004; A63H 33/08; A63H 33/04; A63H 33/042; A63H 33/044; A63H 33/06; A63H 33/062; A63H 33/065; A63H 33/086; A63H 33/088
See application file for complete search history.

(56) References Cited

U.S. PATENT DOCUMENTS

| 6,126,506 | A | * | 10/2000 | Rudy | A63H 33/082 446/124 |
| 2014/0273712 | A1 | * | 9/2014 | Uttley | A63H 33/102 446/121 |
| 2017/0014727 | A1 | * | 1/2017 | Chen | A63H 33/086 |
| 2017/0340981 | A1 | * | 11/2017 | Iliovits | A63H 33/086 |
| 2020/0282323 | A1 | * | 9/2020 | MacArthur | A63H 33/102 |
| 2020/0360830 | A1 | * | 11/2020 | Mølgaard | A63H 33/086 |

* cited by examiner

*Primary Examiner* — William V Gilbert

(57) ABSTRACT

The Invention is a panel of modular pieces that can be assembled into a series of different useful objects that include a chair, table, wall, car chassis and a series of additional items that efficiently accomplish desired outcomes without the need for tools, nails or significant additional pieces. One side of the panel is fully flat to allow for smooth outward facing surfaces on constructions, while the other side has holes that can be used to affix knobs, secure the panels to each other to secure them in a manner that accomplishes a useful purpose with modular poles, snaps, hinges and bearings.

2 Claims, 26 Drawing Sheets

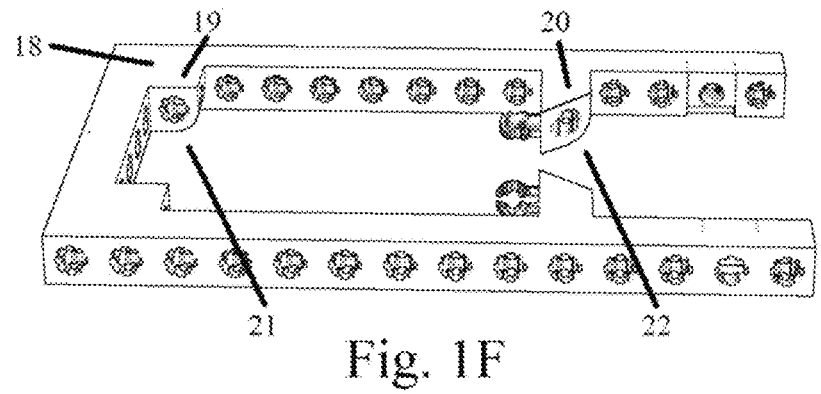
Fig. 1F
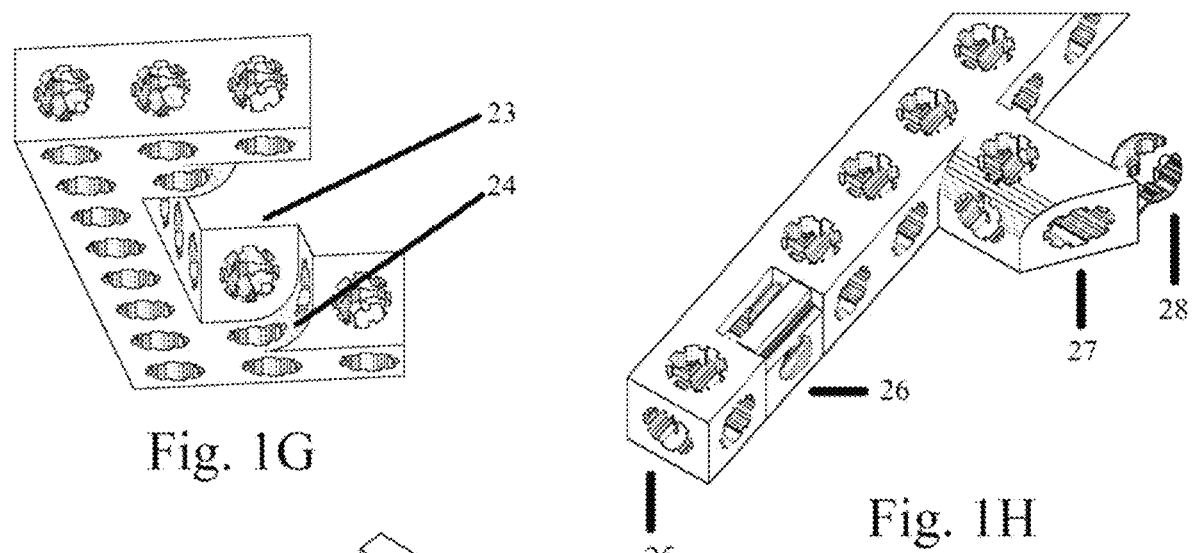
Fig. 1G
Fig. 1H
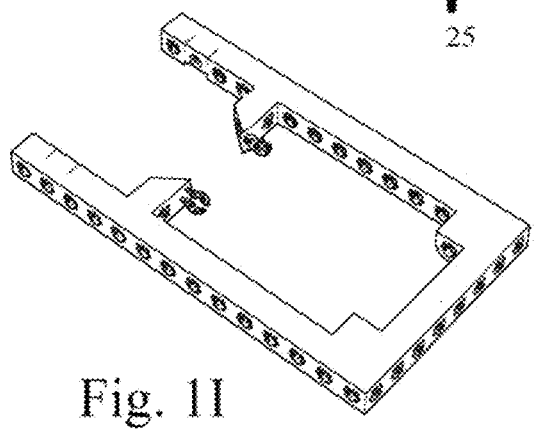
Fig. 1I

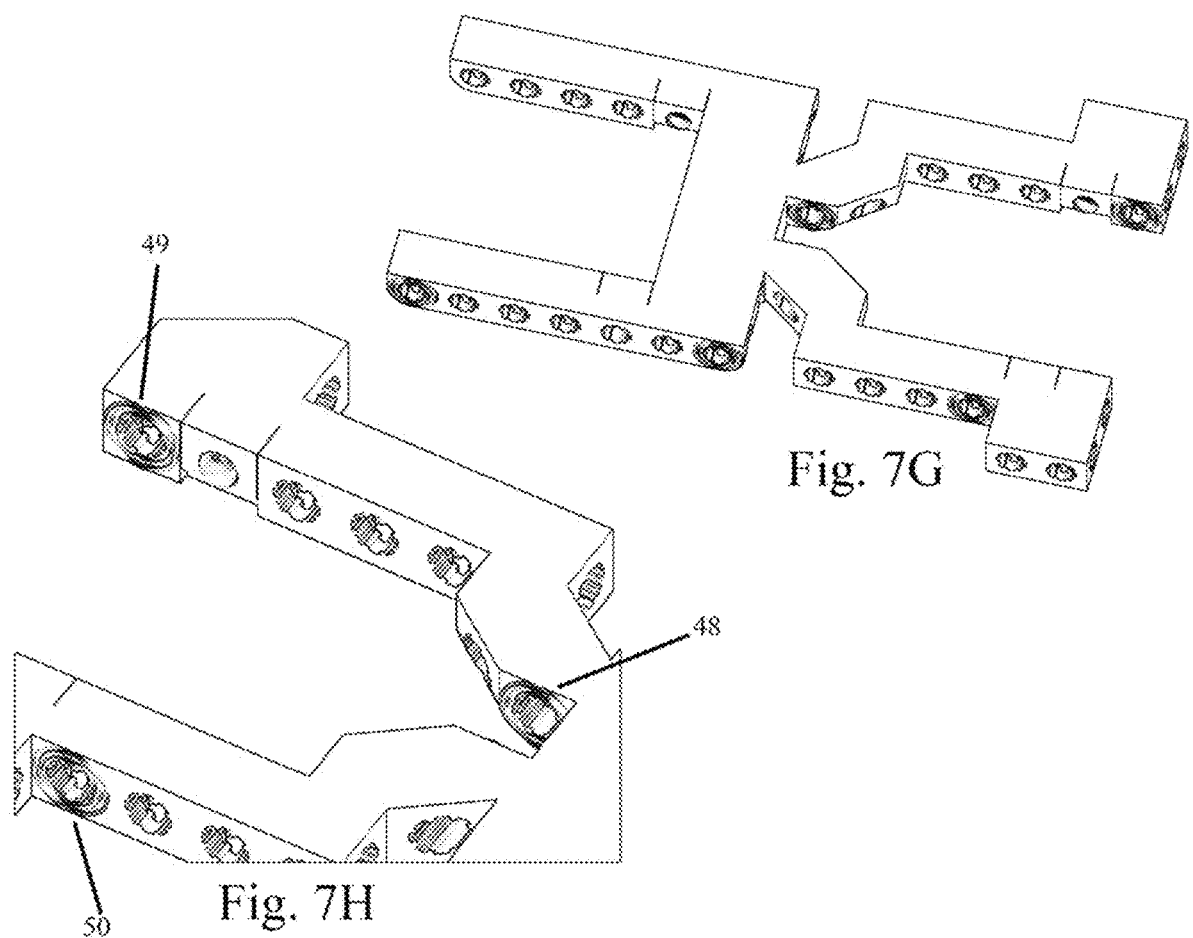
Fig. 7G
Fig. 7H
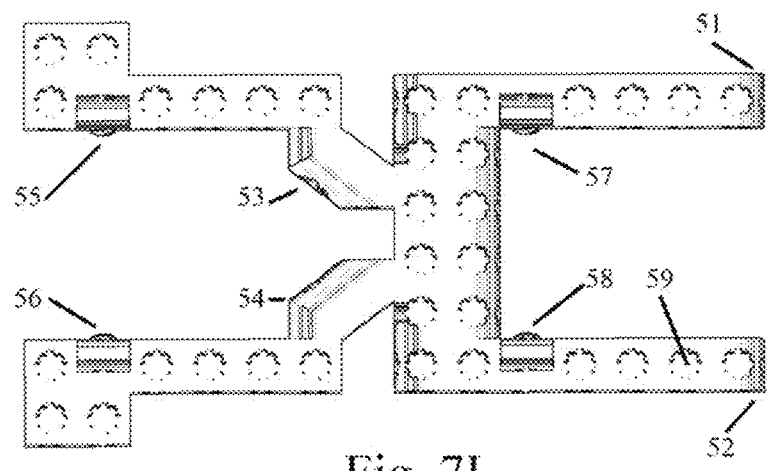
Fig. 7I

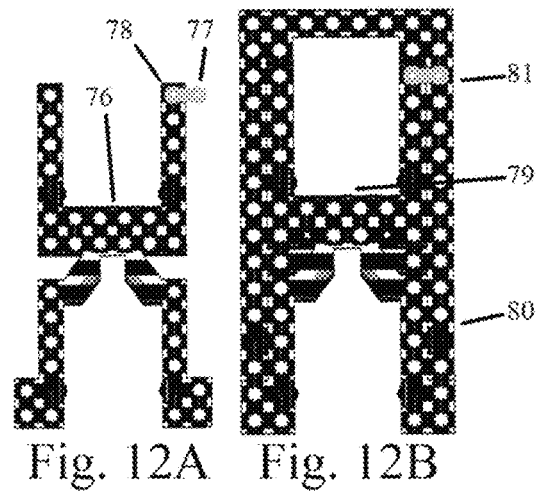
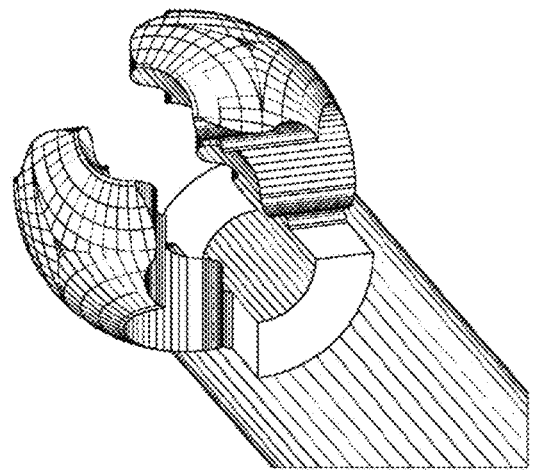
Fig. 12A  Fig. 12B
Fig. 13A
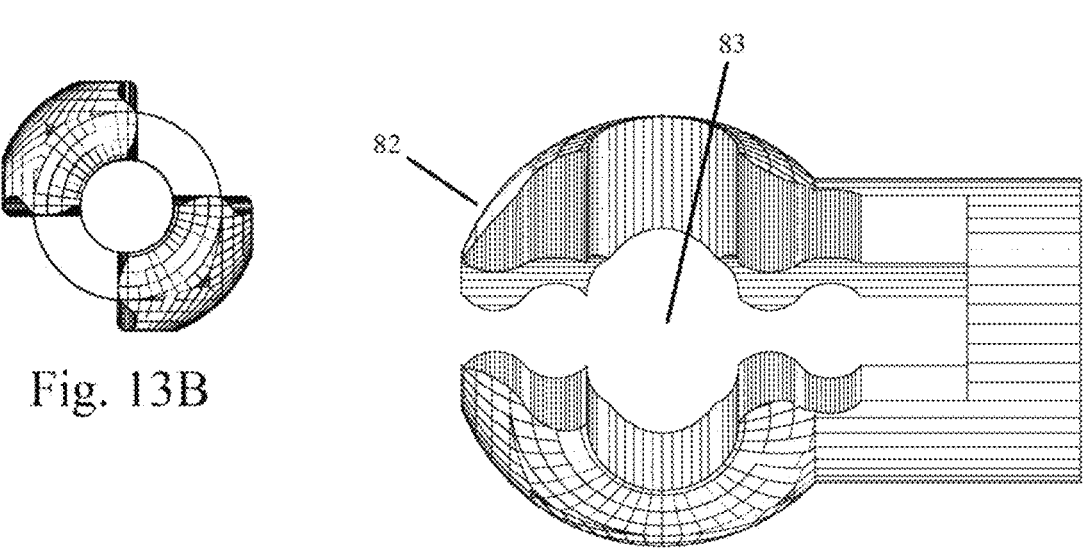
Fig. 13B
Fig. 13C

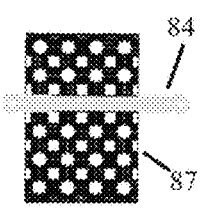
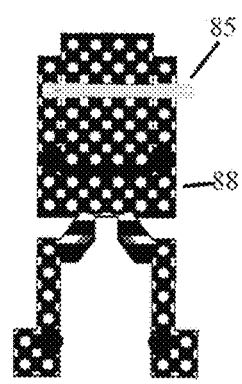
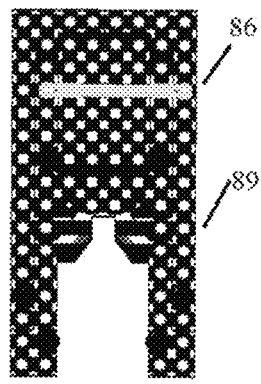
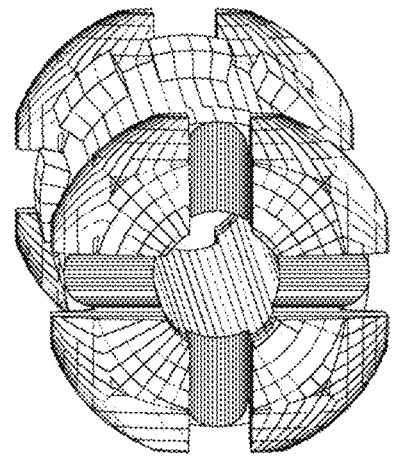
Fig. 14A    Fig. 14B    Fig. 14C
Fig. 15A
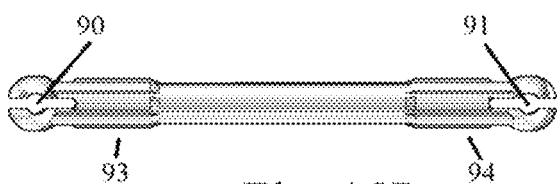
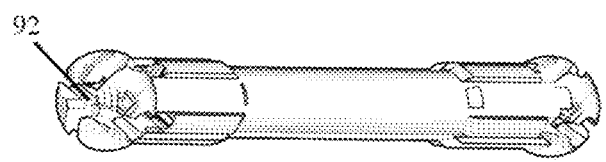
Fig. 15B      Fig. 15C
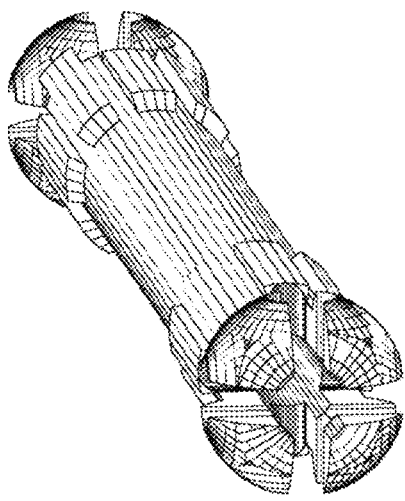
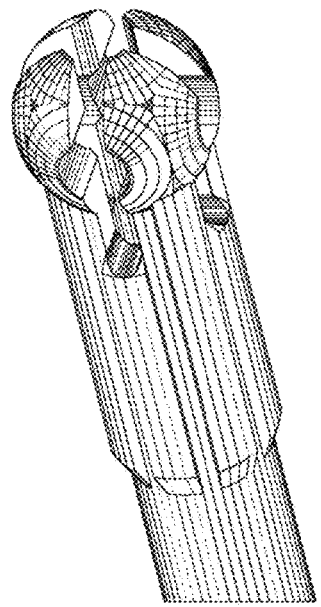
Fig. 15D      Fig. 15E

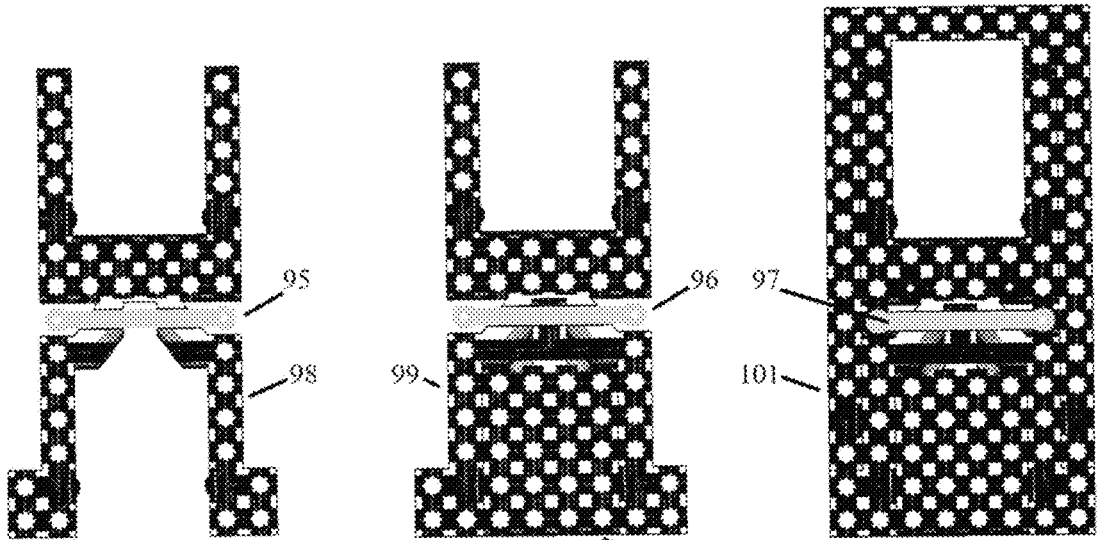
Fig. 16A   Fig. 16B   Fig. 16C
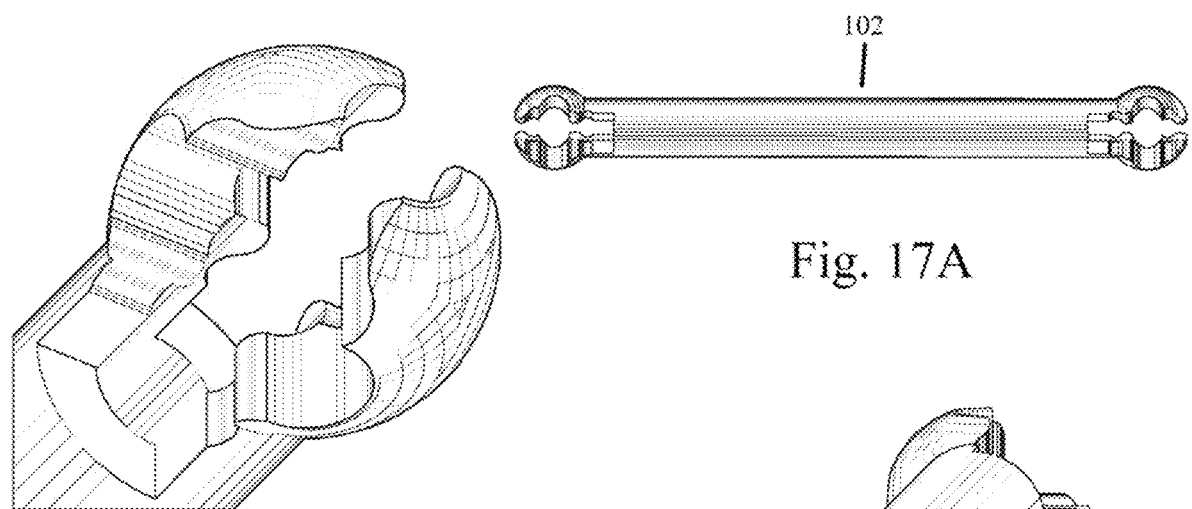
Fig. 17A
Fig. 17B
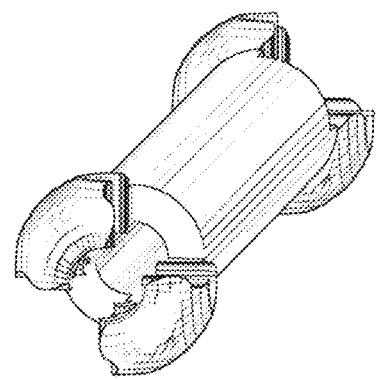
Fig. 17C

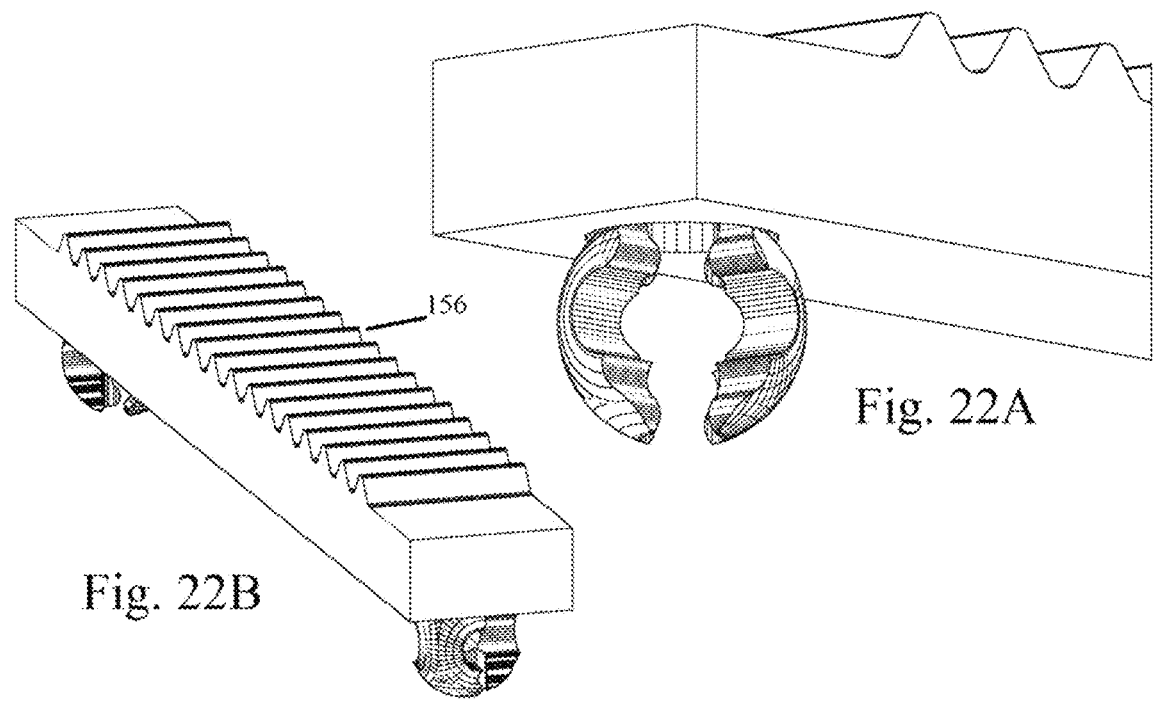
Fig. 22A
Fig. 22B
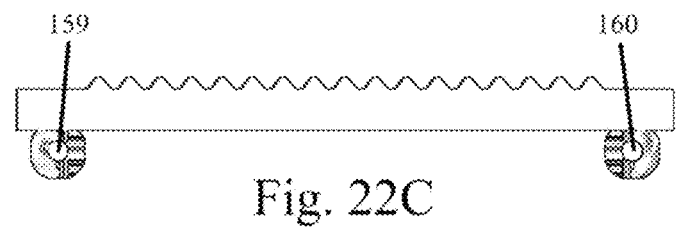
Fig. 22C
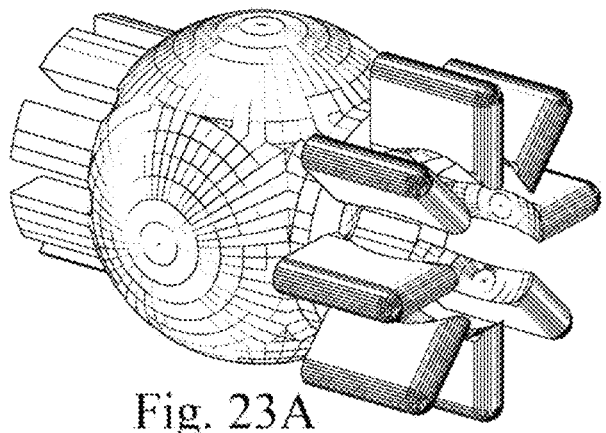
Fig. 23A
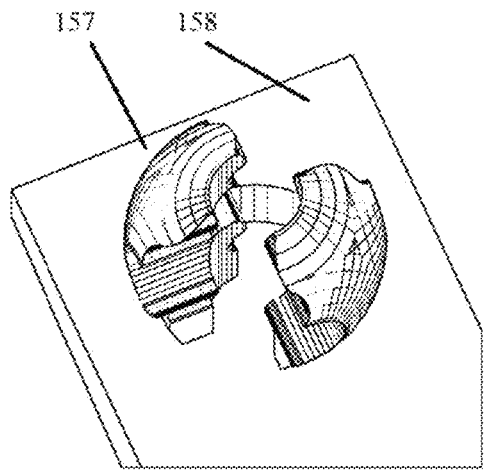
Fig. 22D

MEGAMODULE PANEL SYSTEM

BACKGROUND OF THE INVENTION

Field of the Invention

The Megamodule Panel System ("Invention") is a versatile building system with modular shapes that with snaps, hinges, poles, spheres and panel sub-units assembles into a wide range of useful constructions including walls, roofs, chairs, car chassis, bookcases, tables and a series of additional items.

Description of Related Art

Folding chairs occupy both flat space and can be opened to form a chair.

Modular building sets have panels that fit into themselves to form larger panels.

BRIEF SUMMARY OF THE INVENTION

The assembled Invention in its base state is a panel that is twice as long as it is wide and it is one eighth as tall as it is wide. The relative size of the Invention's pieces to each other is important and the Invention does not have a specific absolute size. It can be large, small and all sized in between so long as the features within the Invention maintain their same relationship towards each other (i.e., so long as the panel remains twice as long as it is wide, etc.).

Sub parts of the Invention are parts of the panel that can be removed to create an opening, or can be rotated to create a seat rest, shelf, or for other useful purposes.

The Invention has an internal shaft system into which knobs and poles can be inserted to hold, lock or reinforce the Invention.

BRIEF DESCRIPTION OF THE SEVERAL VIEWS OF THE DRAWINGS

FIG. 1F is a view of the outer frame that shows how the top side of the frame is smooth while the two protruding parts at the left and middle right of the piece are rounded on the bottom side to allow for pieces to rotate relative to this piece at those points.

FIG. 1G is a closeup view of the flat and rounded configuration described at FIG. 1F above.

FIG. 1H is a closeup view of a bottom leg portion of the outer frame.

FIG. 1I is a different view of the outer frame for clarity.

FIG. 4B is a view of the assembled Invention into a panel that is smooth on one side and has holes and curved edges on the other side.

FIG. 7G is another view of the "X" frame for clarity.

FIG. 7H is a view of the part of the "X" frame with hinges that hold the panel that is inserted, and that can rotate, in the opening to the middle and left of FIG. 7H.

FIG. 7I is a profile view of the bottom of the "X" frame that shows its curved sides, snaps, and holes.

FIG. 9E is a side view of the protruding part that shows how the holes have teeth.

FIG. 9F is a side view of the protruding part that shows how the holes have teeth.

FIG. 9G is a different view of the side of the panel with holes, for clarity.

FIG. 9H is a different view of the side of the panel with holes, for clarity.

FIG. 11C is a side profile view of FIG. 11B.

FIG. 12A shows how the "X" frame that is FIG. 7 can have the small pole that is FIG. A inserted into it at the top right of FIG. 12A.

FIG. 12B is a demonstration of how the "X" frame that is FIG. 7A is inserted into the outer frame that is FIG. 1A and secured by the pole that is FIG. 13A at the upper right side of FIG. 12B.

FIG. 13A is part of a small pole that secures panels that are FIG. 7A and FIG. 1A together.

FIG. 13B is a profile view from the end of FIG. 13A.

FIG. 13C is a side view of FIG. 13A.

FIG. 14A is a partial view of FIG. 14B.

FIG. 14B is a partial view of FIG. 14C.

FIG. 14C is a demonstration of how the pole that is FIG. 15A secures the panel that is FIG. 8A to the rest of the Invention.

FIG. 15A is a closeup view of the pole that is the light gray horizontal line towards the top of the images in FIG. 14A, FIG. 14B and FIG. 14C.

FIG. 15B is a profile view of this pole that shows how, after its ends are inserted into the Invention in the manner shown in FIG. 14A, a smaller pole can be inserted into the holes at the ends, or through the hole that runs through the entire piece, to lock the pole in place.

FIG. 15C is a different view of the same pole for clarity.

FIG. 15D is a different view of the same pole for clarity.

FIG. 15E is a different view of the same pole for clarity.

FIG. 16A is a partial view of FIG. 16B.

FIG. 16B is a partial view of FIG. 16C.

FIG. 16C shows how the pole that is FIG. 17A fits through the "X" frame that is FIG. 7A (FIG. 16A), the "X" frame plus the small panel that is FIG. 9 (FIG. 16B) and the outer frame that is FIG. 1 (FIG. 16C).

FIG. 17A is a pole that holds the Invention together in the manner shown in FIG. 16C.

FIG. 17B is a close-up view of an end of FIG. 17A.

FIG. 17C shows a different view of FIG. 17A.

FIG. 20A is an arrangement into which the Invention can be assembled.

FIG. 20N is an arrangement into which the Invention can be assembled.

FIG. 22A is a close-up view of an end of FIG. 22A.

FIG. 22B is a mechanism that a steering mechanism rests on to turn wheels affixed to the Invention.

FIG. 22C is a profile view from the side of FIG. 22B.

FIG. 22D is a sphere snap on FIG. 22B that snaps into FIG. 24A in the manner shown in FIG. 26A and FIG. 26B.

FIG. 23A is another view of FIG. 23C.

FIG. 26A is a different view of part of FIG. 26B.

Figure 26A:
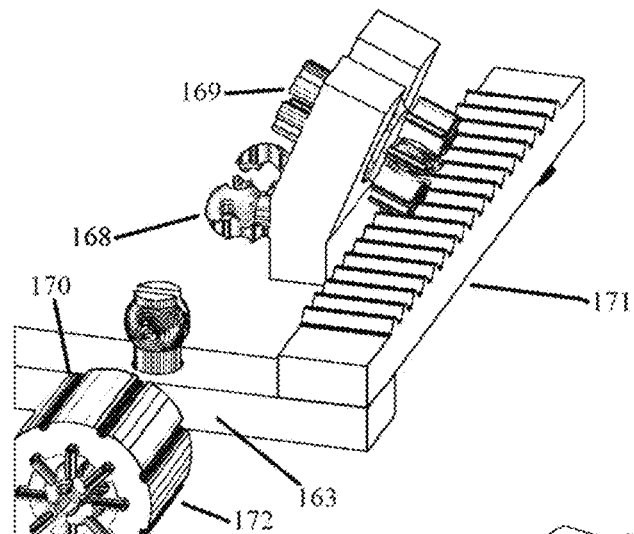
Figure 26B:
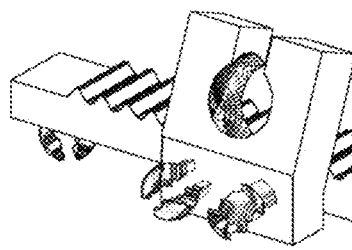

FIG. 26B demonstrates how the different parts that comprise the Invention's steering mechanism fit together but without showing the panel that is the Invention, for clarity.

Figure 27A:
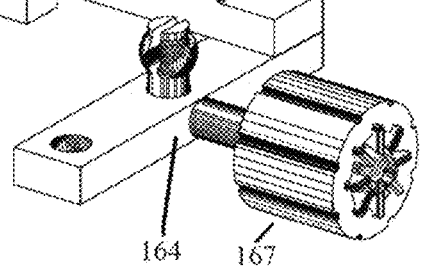
Figure 27A:
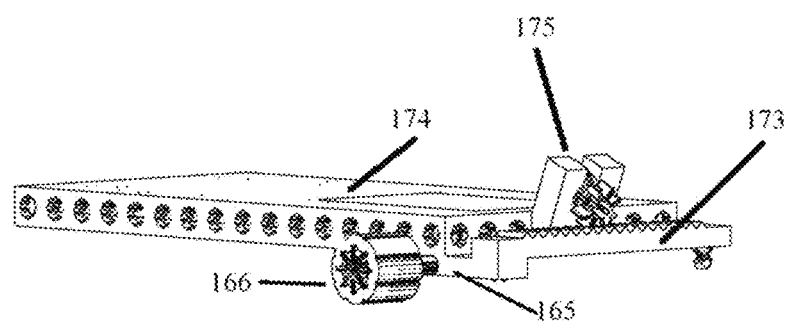

FIG. 27A shows how the Invention's steering mechanism fits into the Invention's panel.

Figure 27B:
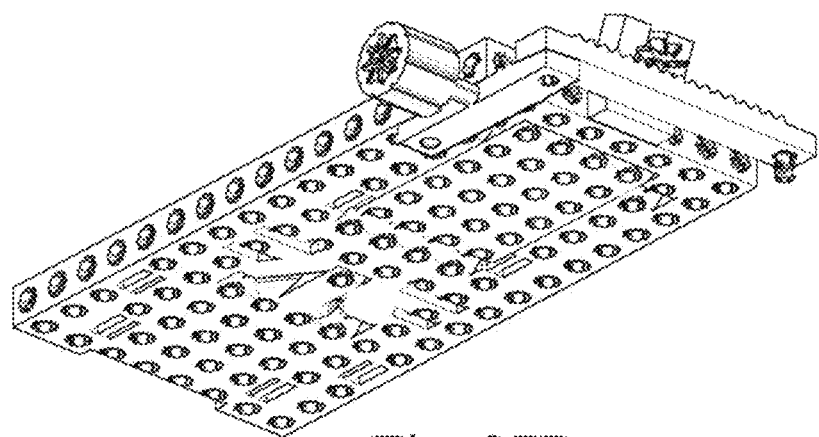

FIG. 27B is another view of FIG. 27A.

Figure 27C:
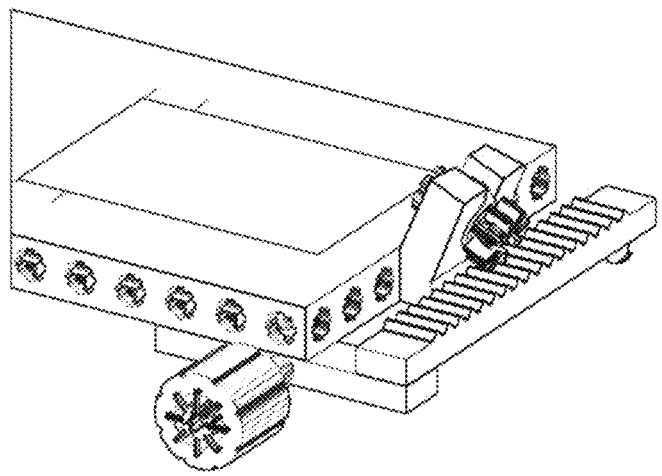

FIG. 27C is a close-up view of FIG. 27A.

Figure 28:
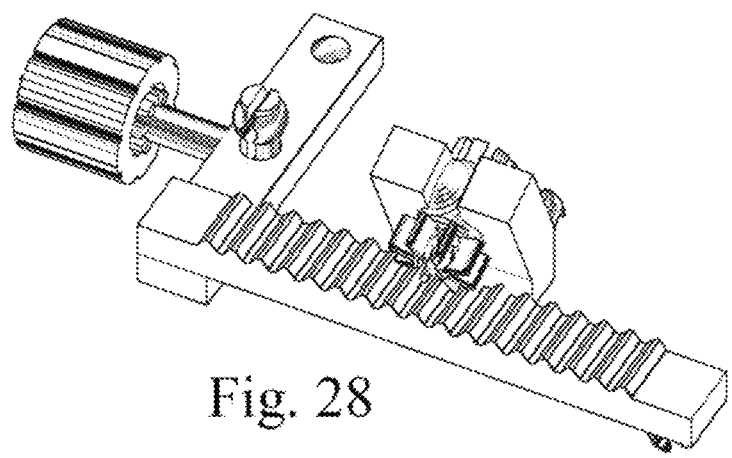

FIG. 28 is a different view of the steering mechanism for clarity.

Figures 29A, 29B:
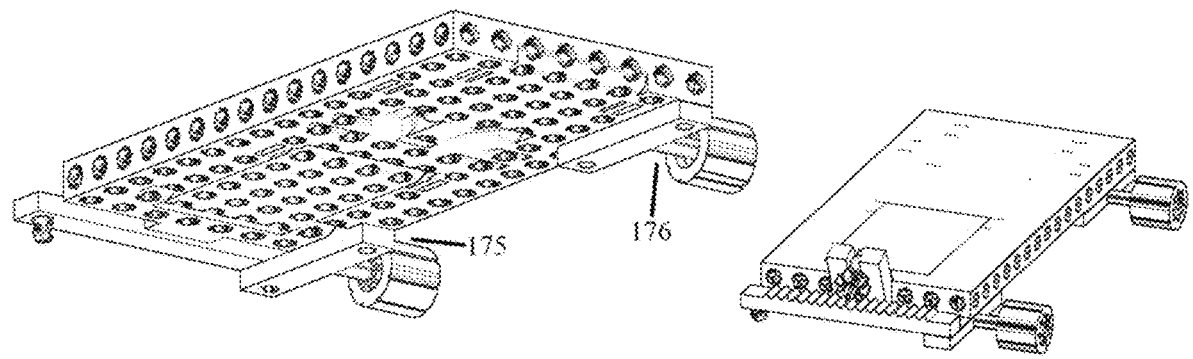

FIG. 29A shows how the wheels can be affixed to the Invention through the steering mechanism (at the back-left part of the construction) and how the wheels can be affixed to the Invention without having steering capability (ass is shown to the right of the image that is FIG. 29A.

FIG. 29B is a different view of FIG. 29A for clarity.

Figure 29C:
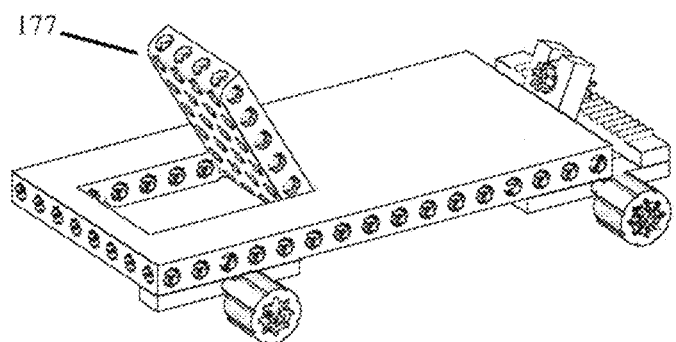

FIG. 29C shows how a panel in the Invention can rotate up to form a chair that is locked in place with the poles that lock with teeth on their sides.

Figure 29D:
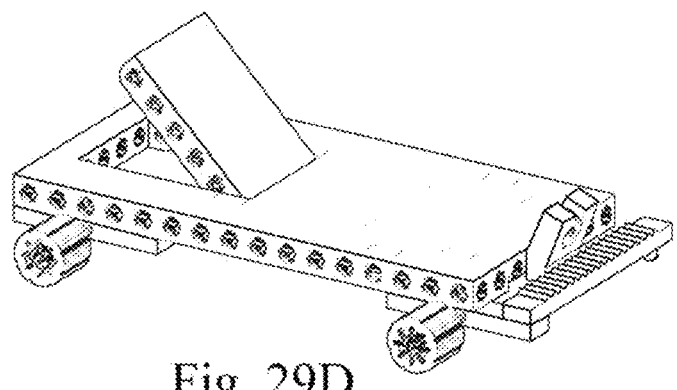

FIG. 29D is a different view of the construction that is FIG. 29C.

DETAILED DESCRIPTION OF THE INVENTION

Figure 1A:
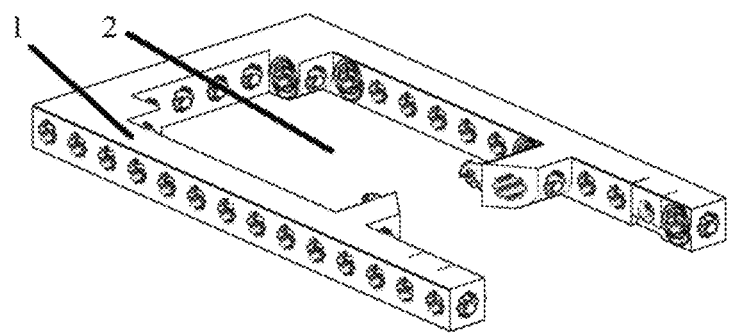
FIG. 1A is the outer frame of the Invention into which the inner parts of the Invention snap onto.

FIG. 1A is the outer frame of the Invention (1) into which (2) the inner parts of the Invention snap onto.

Figure 2:
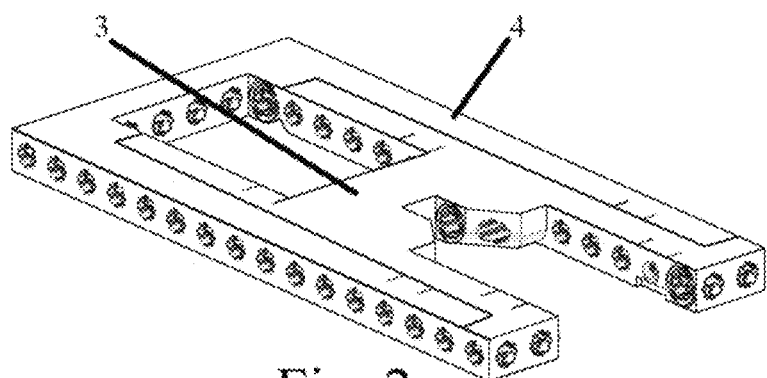
FIG. 2 is a view of how an inner part of the Invention in the rough shape of an "X" (identified herein as FIG. 7A) is inserted into the outer frame that is FIG. 1A.

FIG. 2 is a view of how an inner part of the Invention (3) in the rough shape of an "X" (identified herein as FIG. 7) is inserted into the outer frame that is FIG. 1A (4).

Figure 3:
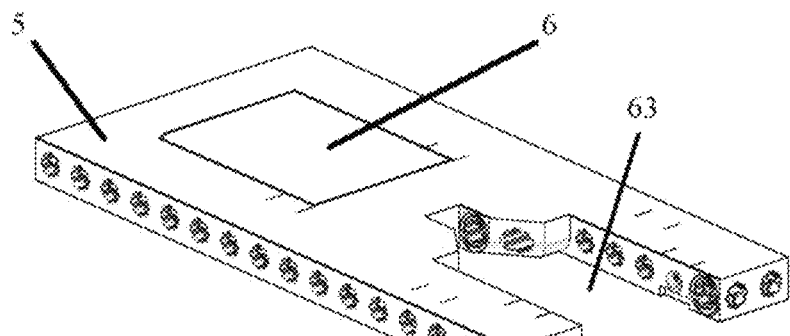
FIG. 3 is a view of FIG. 2 in which a panel is inserted at the top to fill the hole.

FIG. 3 is a view of FIG. 2 (5) in which a panel is inserted at the top to fill the hole (6).

FIG. 4 is a view of FIG. 3 (7) in which a panel is inserted into the bottom opening (8) to create a flat panel that is one half as wide as it is long.

Figure 1B:
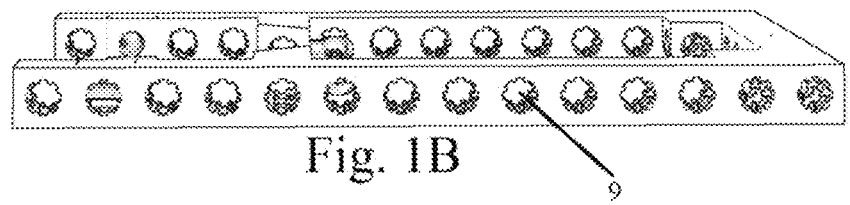
FIG. 1B is a side view of the outer frame of the Invention that shows the holes into which poles and knobs can be inserted to hold, lock or reinforce the panel.

FIG. 1B is a side view of the outer frame of the Invention that shows the holes (9) into which poles and knobs can be inserted to hold, lock or reinforce the panel.

Figure 1C:
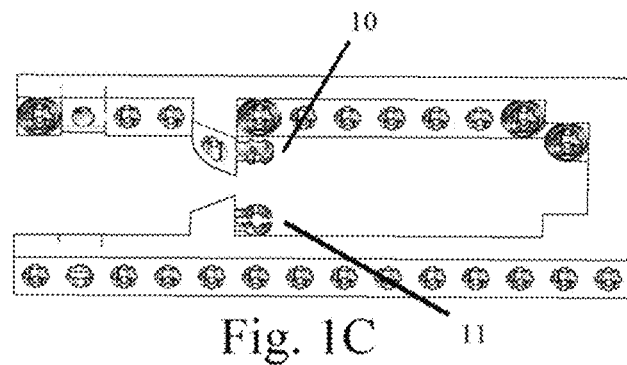
FIG. 1C is a slightly different view of the outer frame of the panel Invention.

FIG. 1C is a slightly different view of the outer frame of the panel Invention. At the middle left center part of FIG. 1C there are partial sphere shapes (10, 11) that push into another part of the panel and that also snap into other Invention parts.

Figure 1D:
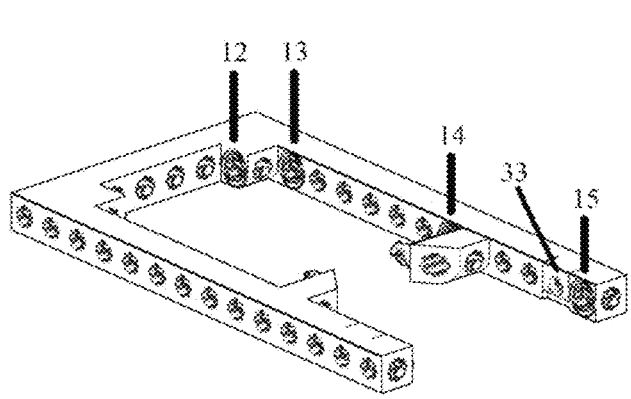
FIG. 1D is a view of the outer frame with elements denoting the location of hinge geometries that are on the frame.

FIG. 1D is a view of the outer frame with elements denoting the location of hinge geometries that are on the frame (12, 13, 14, 15). Each of these hinges are found on the opposing side of the same frame. These hinge geometries fit into opposing hinge geometries on other pieces so that the sub-parts of the Invention can rotate relative to each other. The hinges have bumps, or undulations, that enable pieces to not just rotate relative to each other, but to also rotate and be secured at specific angles, like at 180 degree or 90-degree angles. At element 12 is a hinge that secures the top small panel and that allows that panel to rotate out from the outer frame. At element 13 is a hinge that allows the inner frame that is roughly in the shape of an "X" to be secured in place and to rotate relative to the outer frame. This "X" frame is FIG. 7. At elements 14 and 15 are hinges that also allows the "X" frame to rotate.

Figure 1E:
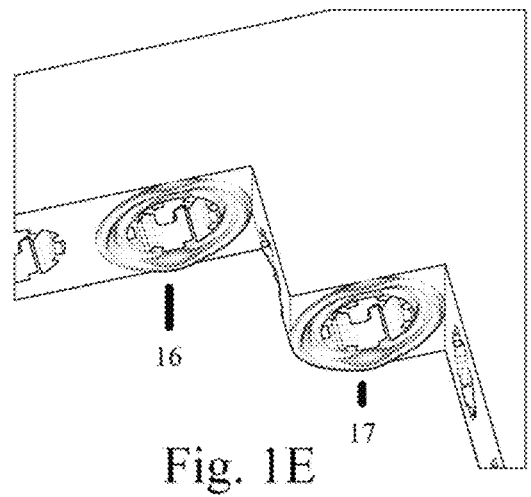
FIG. 1E is a close-up view of the hinges at the opposite side of the frame from elements 1 and 2 in FIG. 1D.

FIG. 1E is a close-up view of the hinges (16, 17) at the opposite side of the frame from elements 12 and 13 in FIG. 1D. The protruding parts of the hinges shown in FIG. 1E (16, 17) line up with receding hinge parts on the pieces that fit into those hinge locations.

FIG. 1F is a view of the outer frame that shows how the top side of the frame is smooth (18) while the two protruding parts at the left (19) and middle right (20) of the piece are rounded on the bottom side (21, 22) to allow for pieces to rotate relative to this piece at those points.

FIG. 1G is a closeup view of the flat (23) and rounded (24) configuration described at FIG. 1F above.

FIG. 1H is a closeup view of a bottom leg portion of the outer frame. Element 25 shows where poles or spheres can be inserted to strengthen or to connect this piece to other pieces. Element 26 shows a snap that is discussed at FIG. 6 below. Element 27 is an insertion point with teeth that perform the function described in relation to element 30 in FIG. 5B below. Element 28 on FIG. 1H is a snap that has a rough spherical shape that fits into other shapes that are just like it (i.e., it is reversible) and that fits into panels to secure them in place when the Invention is assembled into one flat surface. It also fits into panels and other objects that are inserted at angles perpendicular, and at additional angles, to the outer frame (a portion of that outer frame is shown in FIG. 1H).

FIG. 1I is a different view of the outer frame for clarity.

Figure 5A:
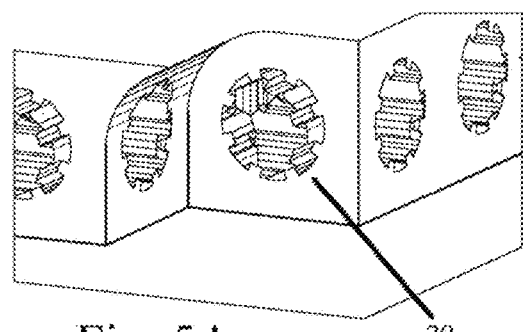
FIG. 5A is a view of the part of the frame that is in FIG. 1E except it does not have a hinge.

FIG. 5A is a view of the part of the frame that is in FIG. 1E except it does not have an undulating hinge around the opening (29).

Figure 5B:
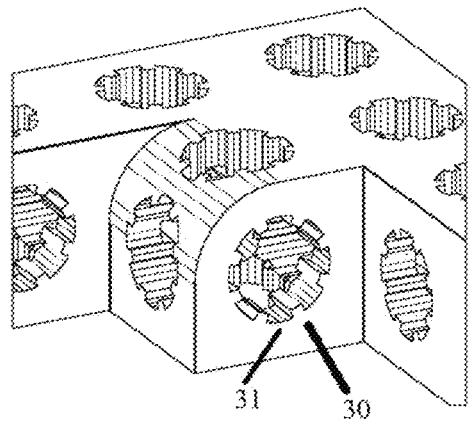
FIG. 5B is a view of the same area as FIG. 5A, but from a different angle.

FIG. 5B is a view of the same area as FIG. 5A, but from a different angle. The teeth denoted by element 30 in FIG. 5B hold poles or knobs that are inserted to reinforce or to secure the Invention's pieces. Poles or knobs that have corresponding receding spaces (31) will allow the construction to be rotated, and then locked, at different angles.

Figure 6:
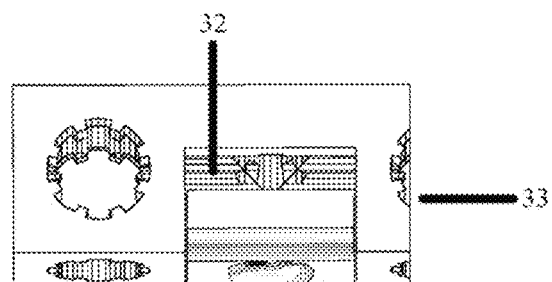
FIG. 6 is a snap that secures panel parts together.

FIG. 6 shows a snap (32) that secures panel parts together. It can be placed throughout the Invention and appears just to the left of element 15 in FIG. 1D (33) and that is at element 26 in FIG. 1H. The space at element 32 in FIG. 6 is where the snap moves into when a panel is pressed against the snap at the location of element 34. Holes in panels snap onto the bulge at element 34 and are held in place by this snap. This snap can then be locked if a sphere or pole is inserted into the frame from the left or right. One insertion point is denoted by element 33.

Figure 7A:
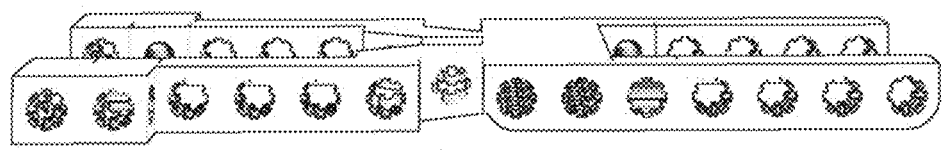
FIG. 7A is a lateral view of the "X" frame that goes inside the outer frame in the manner shown at FIG. 2.

FIG. 7A is a lateral view of the "X" frame that goes inside the outer frame in the manner shown at FIG. 2 (3).

Figure 7B:
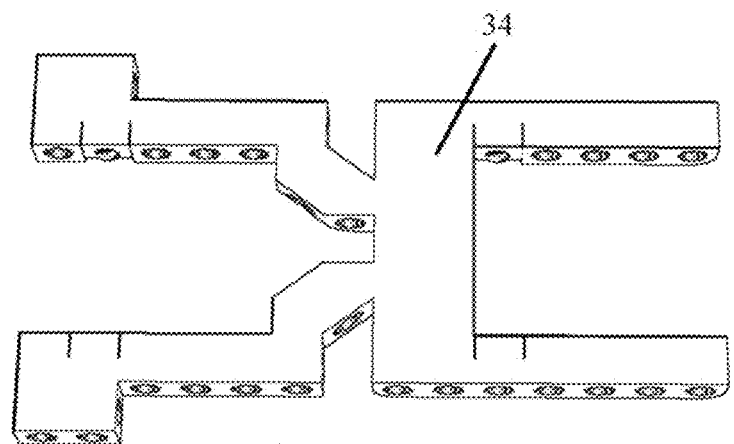
FIG. 7B is a view of the "X" frame from its flat top.

FIG. 7B is a view of the "X" frame from its flat top (34).

Figure 7C:
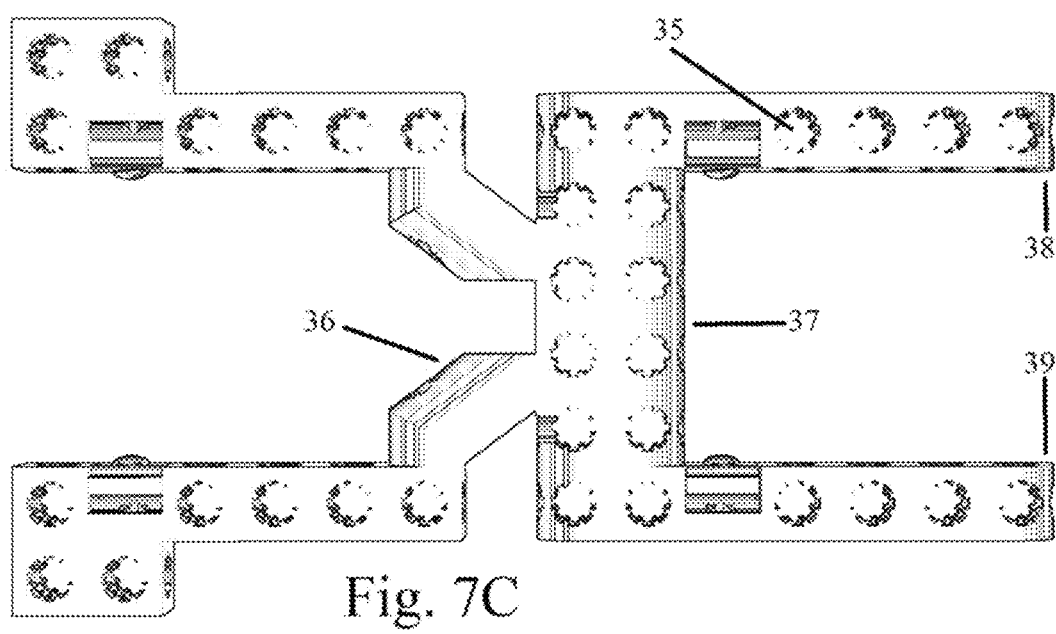
FIG. 7C is a view of the "X" frame from its bottom.

FIG. 7C is a view of the "X" frame from its bottom. Holes that allow for the insertion of knobs and poles appear in this view (35). Also, rounded edges in the middle (36, 37) and right side (38, 39) of this FIG. 7C allow for this piece to rotate relative to other pieces.

Figure 7D:
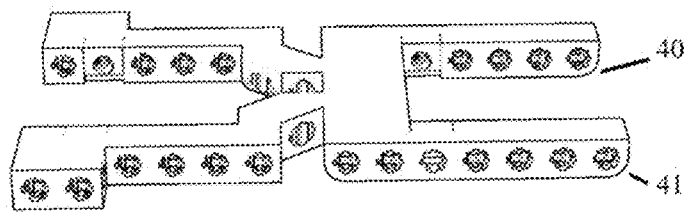
FIG. 7D is another view of the "X" frame that shows the rounded edges at the bottom side of the protruding part to the right.

FIG. 7D is another view of the "X" frame that shows the rounded edges at the bottom side of the protruding part to the right (40, 41).

Figure 7E:
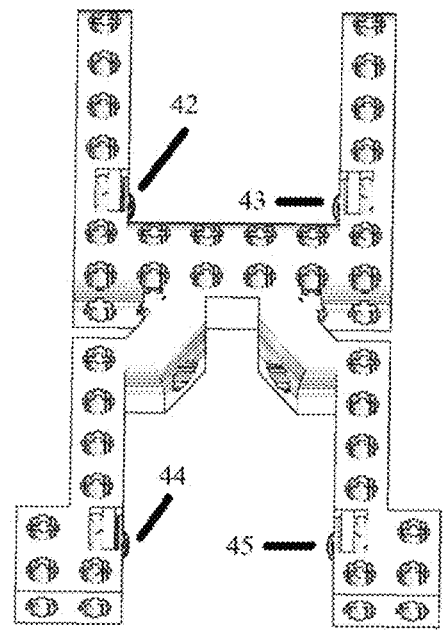
FIG. 7E is a view of the "X" frame from which the snaps discussed at FIG. 6 that secure in place panels inserted between the outside sticks of the "X" frame that is FIG. 7.

FIG. 7E is a view of the "X" frame from which are visible the snaps discussed at FIG. 6 (42, 43, 44, 45) that secure in place panels inserted between the outside sticks of the "X" frame that is FIG. 7. The locations of those snaps, which fit into holes of the panels that go inside, are denoted by elements nos. 42, 43, 44 and 45 in FIG. 7E.

Figure 7F:
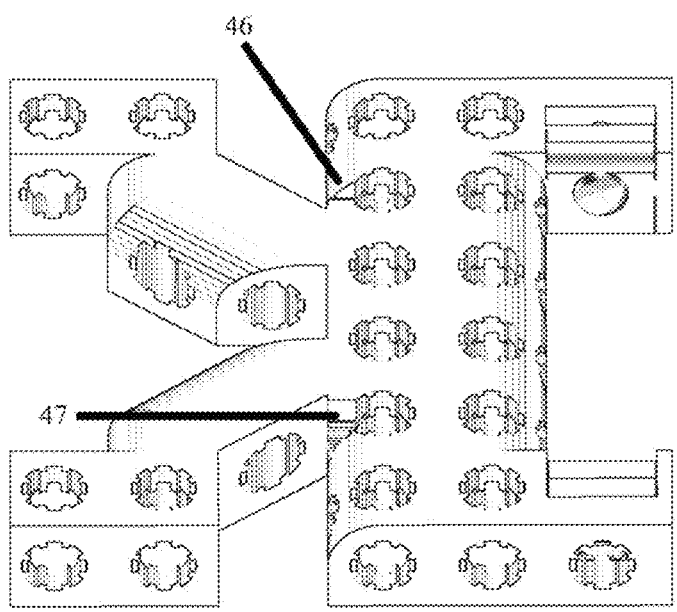
FIG. 7F is a close-up view of the "X" frame where the indentations at elements 19 and 20 are clear.
Figure 8A:
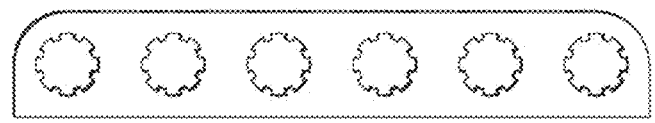
FIG. 8A is a profile view from the side of FIG. 8B.
Figure 8B:
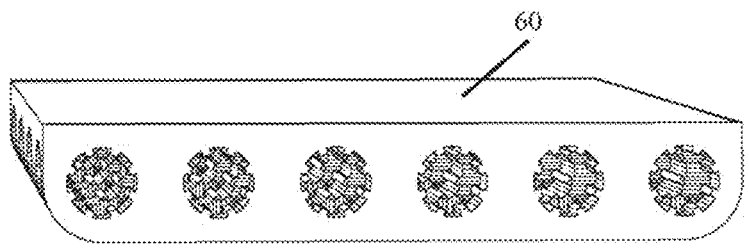
FIG. 8B is a panel that is inserted into the Invention as shown in FIG. 3 (it fills the opening to the top left of FIG. 2).
Figure 8C:
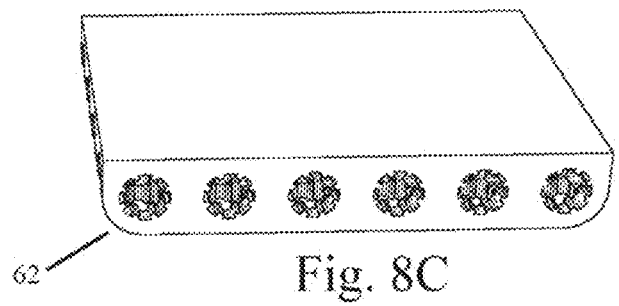
FIG. 8C is another view of FIG. 8B.
Figure 8D:
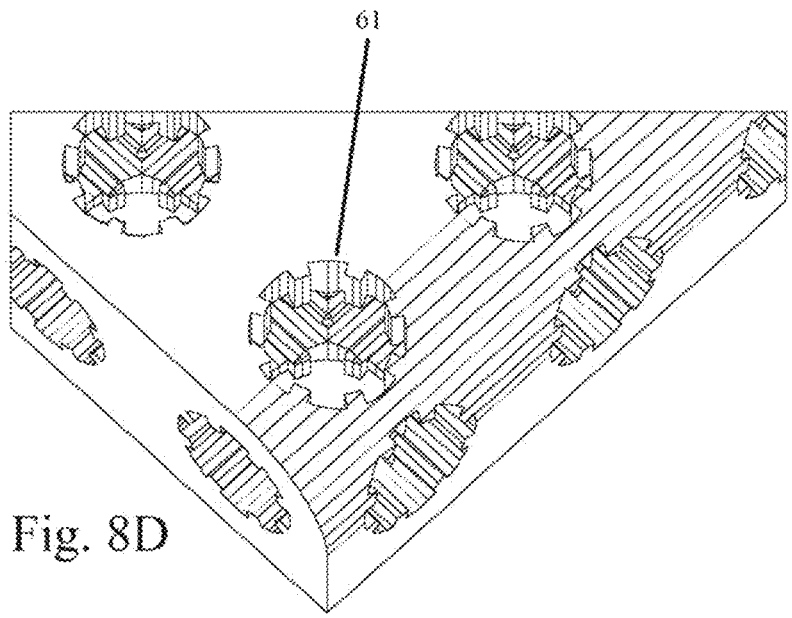
FIG. 8D is another view of FIG. 8B.

FIG. 7F is a close-up view of the "X" frame where the indentations at elements 46 and 47 are clear. These are the locations into which the rough sphere shape is inserted or snapped. That rough sphere shape is discussed at FIG. 1H element 28.

FIG. 7G is another view of the "X" frame for clarity.

FIG. 7H is a view of the part of the "X" frame with hinges that hold the panel that is inserted, and that can rotate, in the opening to the middle (48) and left (49, 50) of FIG. 7H.

FIG. 7I is a profile view of the bottom of the "X" frame that shows its curved sides (51, 52, 53, 54), snaps (55, 56, 57, 58), and holes (59).

FIG. 8 is a panel that is inserted into the Invention as shown in FIG. 3 (6). It fills the opening to the top left of FIG.

2 (6). As with the rest of the panels, it is flat on one side (60) and has holes on the other sides (61). The side with holes also has rounded edges (62) to allow it to rotate relative to other Invention pieces. This FIG. 8 panel can be simple, without snaps or protrusions of its own, because it can snap into the other pieces of the Invention.

Figure 4A:
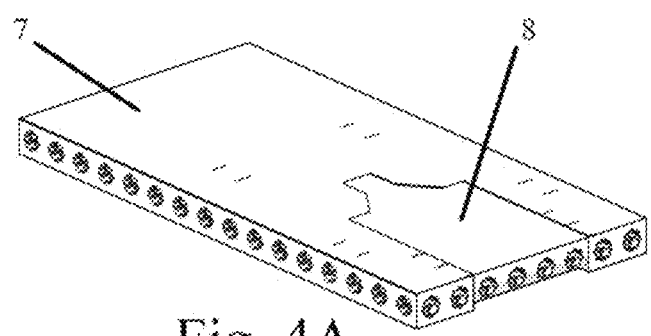
FIG. 4A is a view of FIG. 3 in which a panel is inserted into the bottom opening to create a flat panel that is one half as wide as it is long.

FIG. 9 is the panel that snaps into the empty spot at the bottom right of FIG. 3 (63) to form a fully flat rectangular panel at FIG. 4A (8). Like the other panels in the Invention, it has a flat side (64) and rounded edges on the other side (65) with holes (66) that allow for it to rotate.

Figure 9A:
FIG. 9A is a profile view from the front end of FIG. 9D.
Figure 8E:
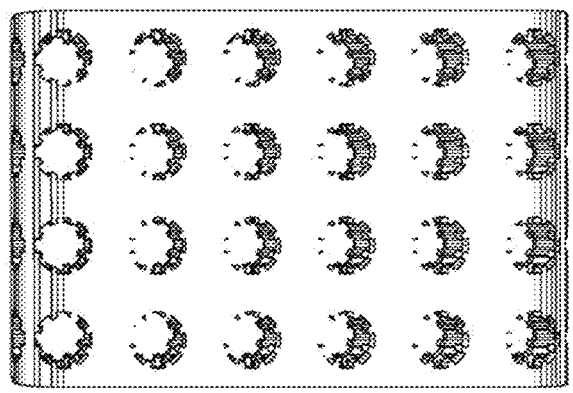
FIG. 8E is a profile view from the bottom of FIG. 8B.
Figure 9B:
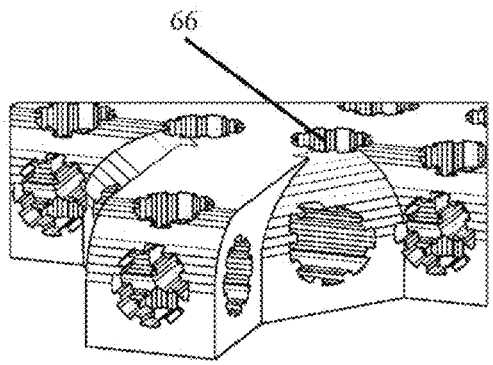
FIG. 9B is a view from the side that protrudes.
Figure 9C:
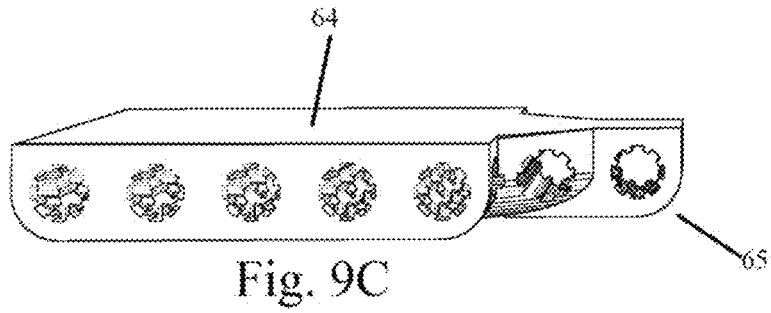
FIG. 9C is a side view of FIG. 9D
Figure 9D:
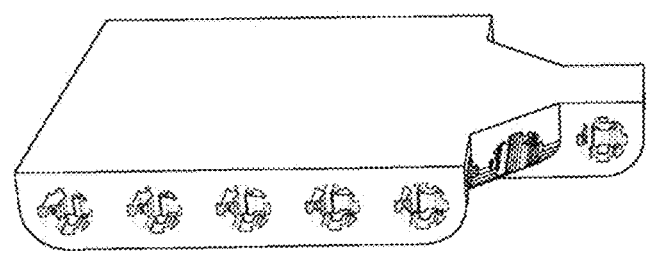
FIG. 9D is the panel that snaps into the empty spot at the bottom right of FIG. 3 to form a fully flat rectangular panel at FIG. 4A.

FIG. 9A is a view from the side that protrudes (65). FIG. 9B is a view of roughly the same area, but from a different angle for clarity. FIGS. 9C and 9D are different views of the panel for clarity.

Figure 9E:
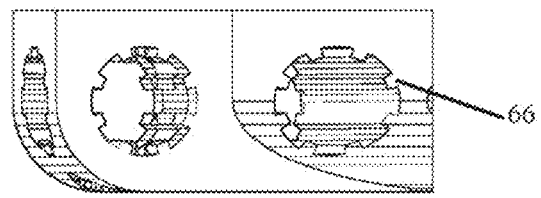
FIGS. 9E and 9F are side views of the protruding part that show how the holes have teeth.
Figure 9F:
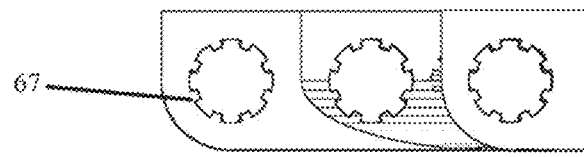

FIGS. 9E and 9F are side views of the protruding part (65) that show how the holes have teeth (66, 67). In this manner, the piece can rotate, and be held in place, with a pole inserted through those holes that has teeth that map to the teeth in the holes (66, 67).

Figure 9G:
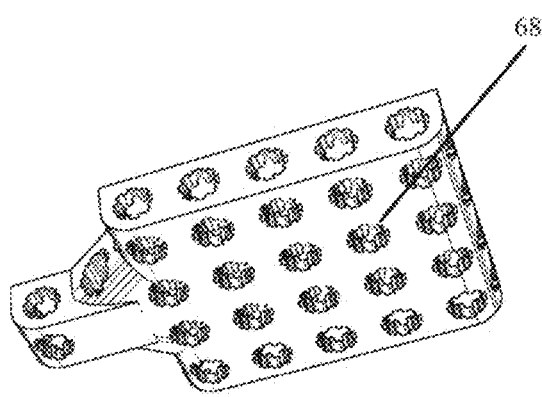
FIGS. 9G and 9H are differing views of the side of the panel with holes, for clarity.
Figure 9H:
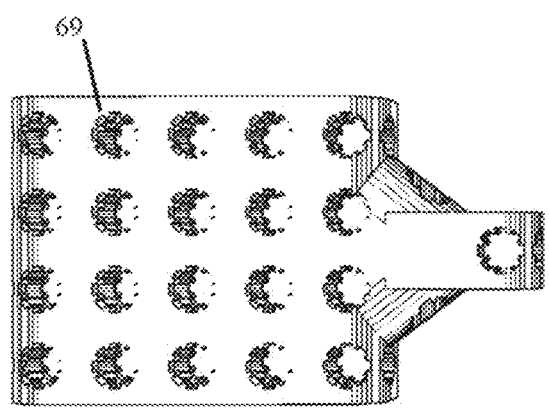

FIGS. 9G and 9H are differing views of the side of the panel with holes (68, 69), for clarity.

Figure 10:
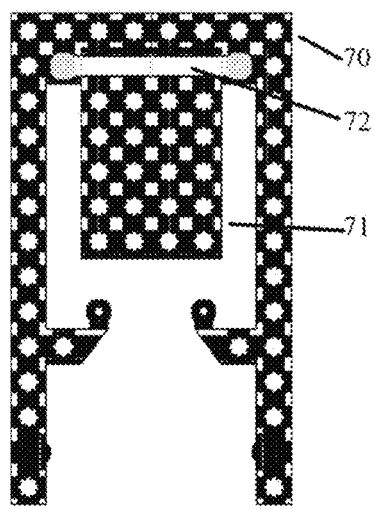
FIG. 10 is a wireframe view of the outer frame that is FIG. 1A with the panel that is FIG. 8A inserted into it.

FIG. 10 is a wireframe view of the outer frame that is FIG. 1 (70) with the panel that is FIG. 8 inserted into it (71). At element 72 is a pole securing these panels together. That pole (72) is FIG. 11.

Figure 11A:
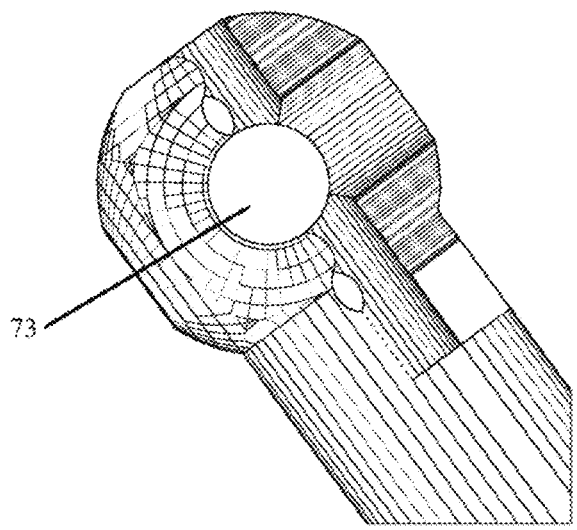
FIG. 11A is a close-up view of the end of a pole that can fit into itself by snapping into itself.

FIG. 11A is a close-up view of the end of a pole that can fit into itself by snapping into itself. It also has a hole (73) into which a shaft can be inserted to secure the pole.

Figure 11B:
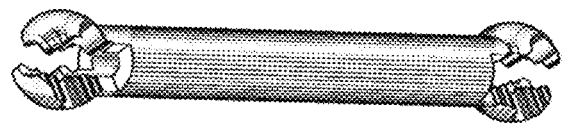
FIG. 11B is a view of the full pole and FIG. 11C is a profile view of the pole showing how smaller poles can be inserted to secure its ends.
Figure 11C:
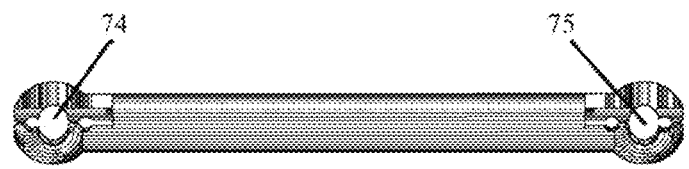

FIG. 11B is a view of the full pole and FIG. 11C is a profile view of the pole showing how smaller poles can be inserted to secure its ends (74, 75).

Figure 13D:
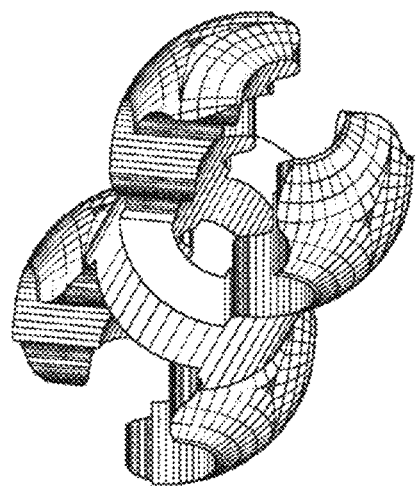
FIG. 13D is another view of FIG. 13F.
Figure 13E:
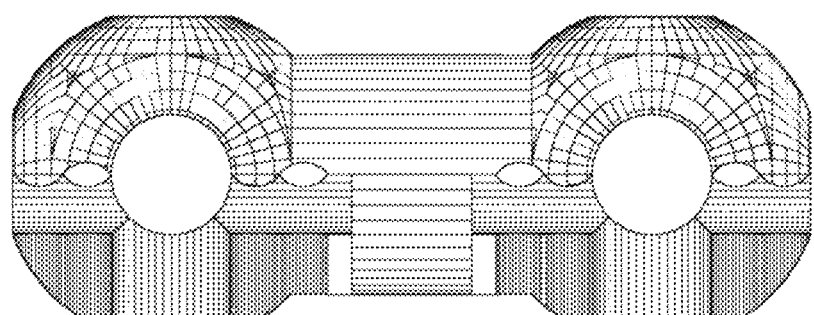
FIG. 13E is a profile view of a complete FIG. 13F.
Figure 13F:
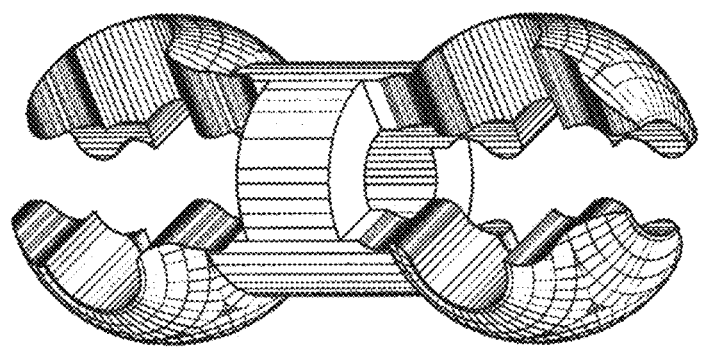
FIG. 13F is a small pole that secures panels that are FIG. 7A and FIG. 1A.

FIG. 12A shows how the "X" frame that is FIG. 7 (76) can have the small pole that is FIG. 13 (77) inserted into it at the top right of FIG. 12A (78).

FIG. 12B is a demonstration of how the "X" frame that is FIG. 7 (79) is inserted into the outer frame that is FIG. 1 (80) and secured by the pole that is FIG. 13 (81) at the upper right side of FIG. 12B.

FIG. 13 is differing views of the small pole that secures panels that are FIG. 7 (79) and FIG. 1 (80) together. It has the same reversible roughly spherical end (82) that the other poles have and that the outer frame that is FIG. 1 (80) has. This end can fit into itself, can fit into holes of the panels and frames, and can be held in place or locked in place with shafts going through the spheres (83).

FIG. 14A is a demonstration of how the pole that is FIG. 15 (84, 85, 86) secures the panel that is FIG. 8 (87, 88, 89) to the rest of the Invention. FIG. 14B shows how it (87) is affixed to the "X" frame (88) and FIG. 14C shows how it is affixed to the outer frame (89) and the "X" frame.

FIG. 15A is a closeup view of the pole that is the light gray horizontal line towards the top of the images in FIGS. 14A (84), B (85) and C (86).

FIG. 15B is a profile view of this pole that shows how, after its ends are inserted into the Invention in the manner shown in FIG. 14, a smaller pole can be inserted into the holes at the ends (90, 91), or through the hole that runs through the entire piece (92), to lock the pole in place. Toward the ends of FIG. 15B, but before the spherical end, are teeth on the side of the pole (93, 94). These teeth lock parts of the invention that have teeth that map onto these teeth. See for example FIGS. 9E (66) and 9F (67).

FIGS. 15C, D and E are different views of the same pole for clarity.

FIG. 16 shows how the pole that is FIG. 17 (95, 96, 97) fits through the "X" frame that is FIG. 7 (98), the "X" frame (99) plus the small panel that is FIG. 9 (100) and the outer frame that is FIG. 1 (101).

FIG. 17 shows different views of the pole that holds the Invention together in the manner shown in FIG. 16 (95, 96, 97). It has smooth sides (102) that allow for the small panel that is FIG. 9 to rotate relative to the "X" frame. This FIG. 17 pole, along with the other poles, can also be inserted into the panels of the Invention without necessarily protruding. For example, FIG. 17 can be inserted vertically into parts of FIG. 16C that are all inside one single piece, like the outer frame that is FIG. 1 (101). These poles can also be inserted in a manner that joins fully assembled FIG. 4A together with other fully assembled FIG. 4A panels.

Figure 18A:
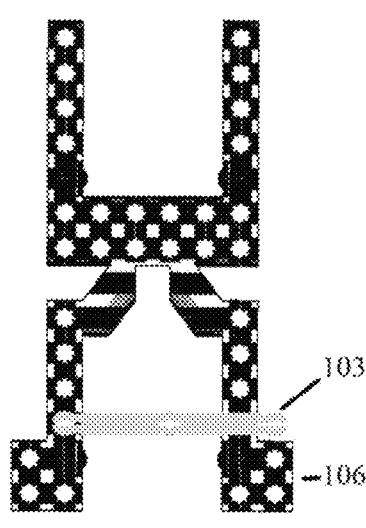
FIG. 18A is a partial view of FIG. 18B.
Figure 18B:
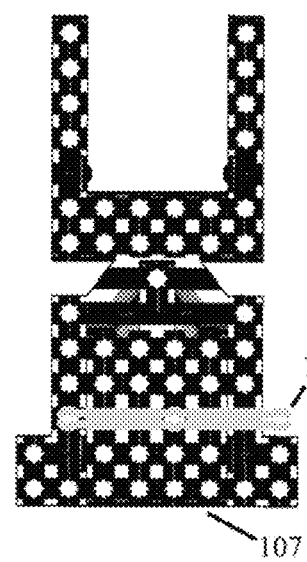
FIG. 18B is a partial view of FIG. 18C.
Figure 18C:
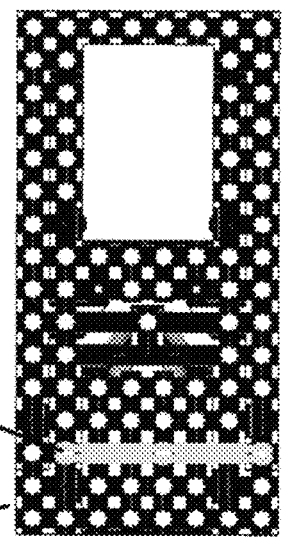
FIG. 18C shows how the pole that is FIG. 19D secures the panel pieces into a single piece.
Figure 19A:
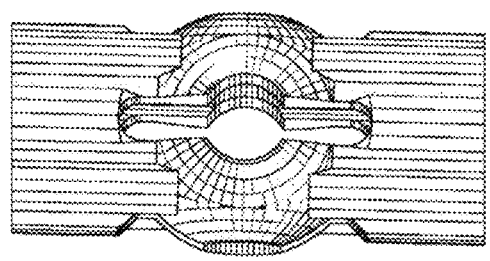
FIG. 19A is a close-up view of the middle of FIG. 19D.
Figure 19B:
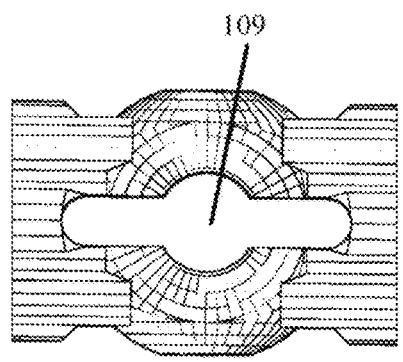
FIG. 19B is a profile view of the middle of FIG. 19D.
Figure 19C:
FIG. 19C is a profile view of FIG. 19D.
Figure 19D:
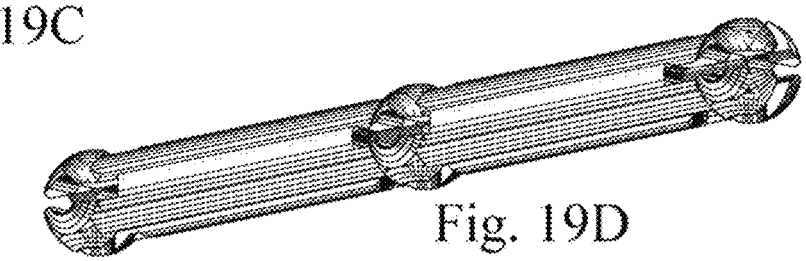
FIG. 19D is a pole that secures the panel pieces into a single piece.
Figure 21A:
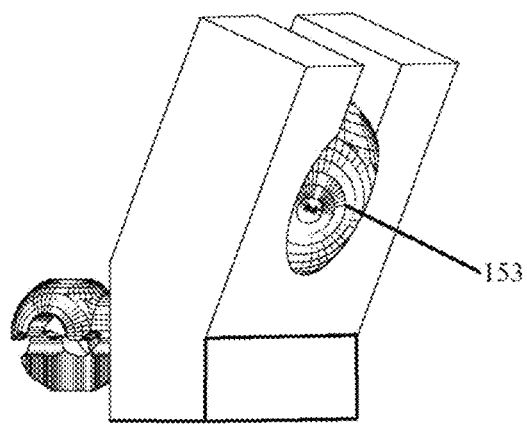
FIG. 21A is an object that holds a steering mechanism.
Figure 21B:
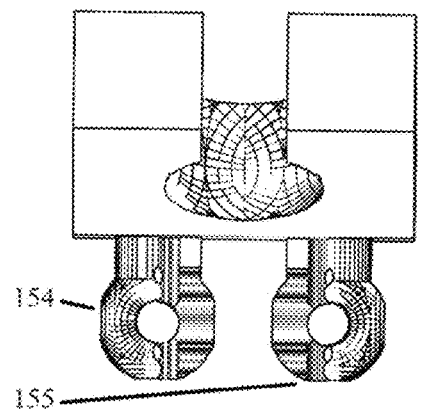
FIG. 21B is a different view of FIG. 21A.
Figure 21C:
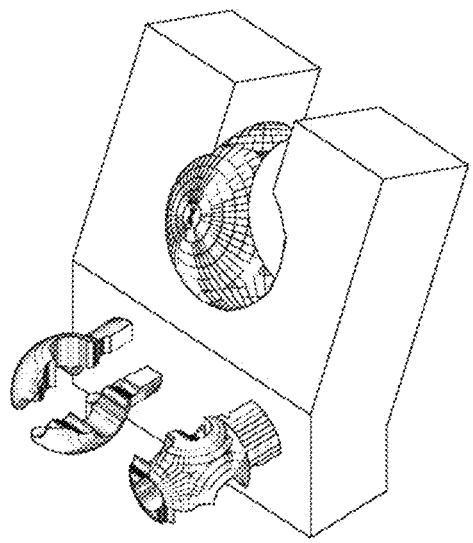
FIG. 21C is a different view of FIG. 21A.
Figure 21D:
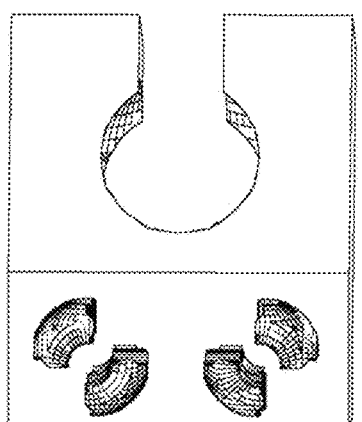
FIG. 21D is a different view of FIG. 21A.
Figure 21E:
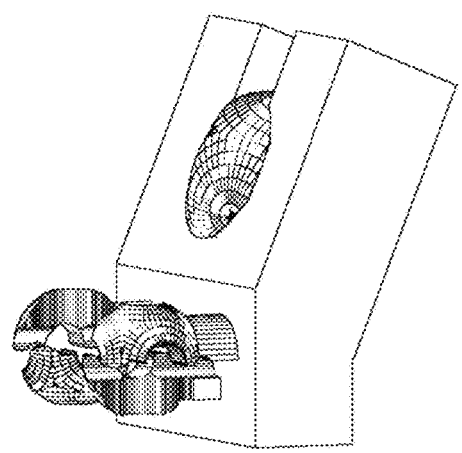
FIG. 21E is a different view of FIG. 21A.
Figure 23B:
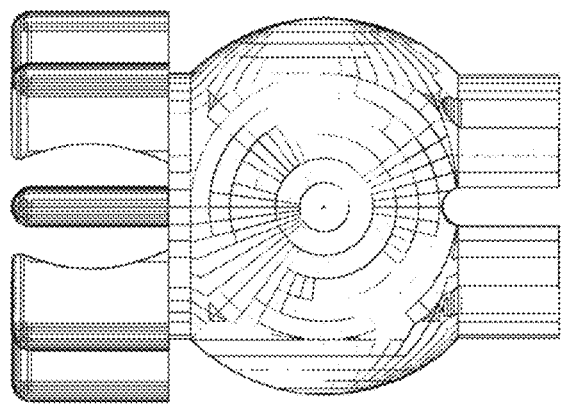
FIG. 23B is a profile view from the side of FIG. 23C.
Figure 23C:
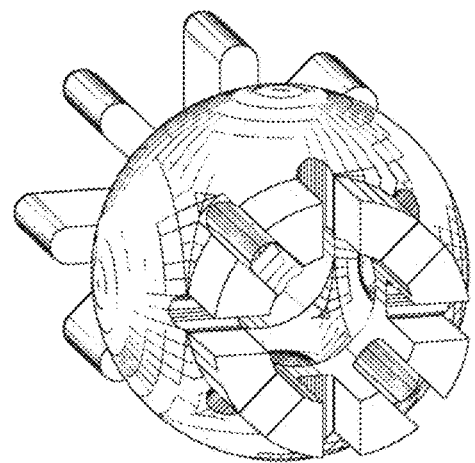
FIG. 23C is the steering mechanism that fits into FIG. 21A so that, when rotated, it can steer the wheels affixed to the Invention in the configurations shown in FIG. 26A and FIG. 27A.
Figure 23D:
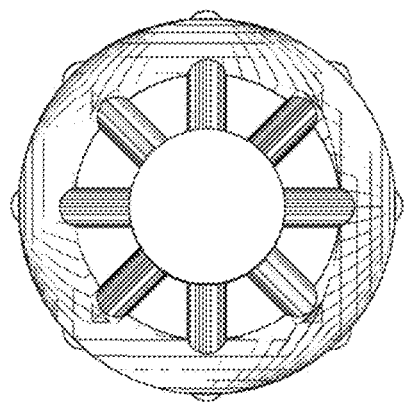
FIG. 23D is a profile view from an end of FIG. 23C.
Figure 23E:
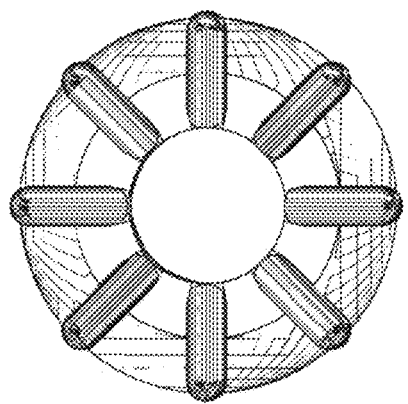
FIG. 23E is a profile view from the other end of FIG. 23C.
Figure 24A:
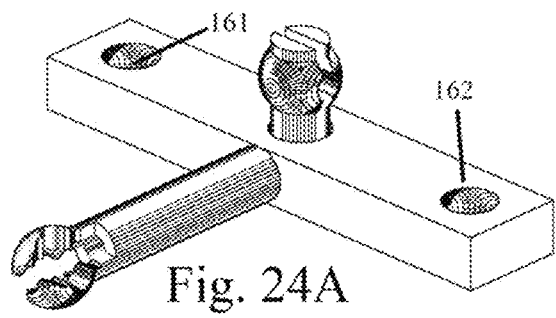
FIG. 24A is a mechanism that snaps into the comb that is FIG. 22A and that also snaps into the wheel and to the Invention's panel in the manner shown in FIG. 26A, FIG. 26B and FIG. 27A.
Figure 24B:
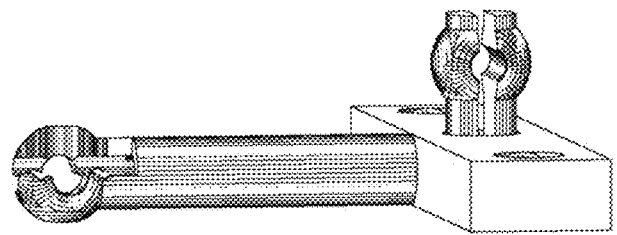
FIG. 24B is another view of FIG. 24A.
Figure 24C:
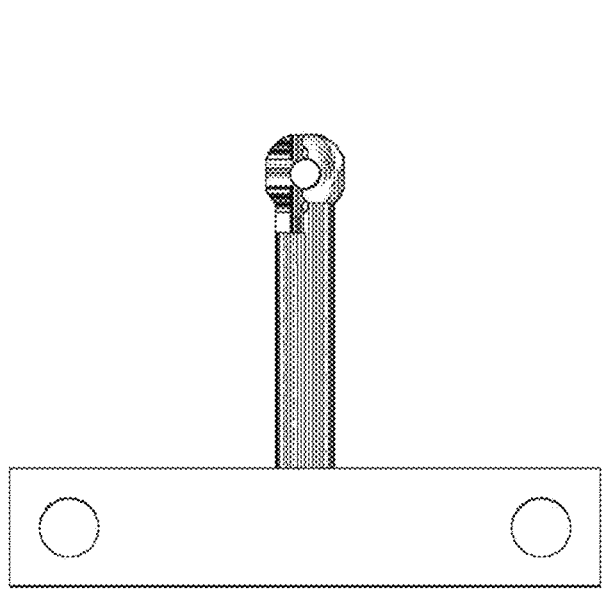
FIG. 24C is a profile view from the bottom of FIG. 24A.
Figure 24D:
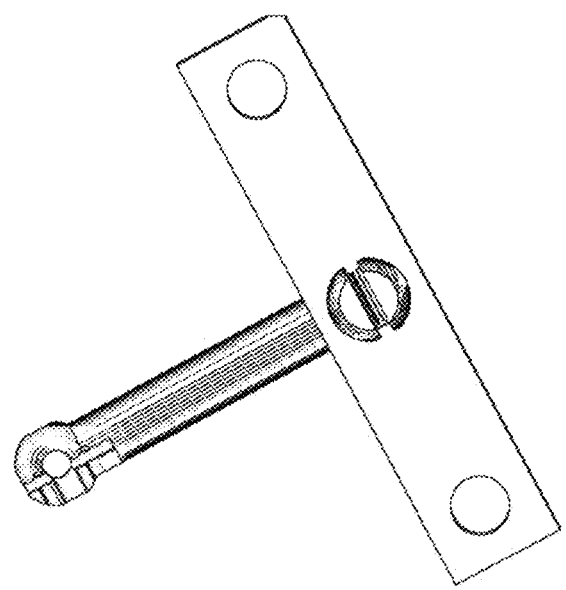
FIG. 24D is a profile view from the top of FIG. 24A.
Figure 25A:
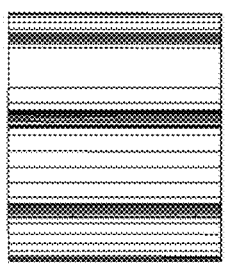
FIG. 25A is a profile view from a side of FIG. 25C.
Figure 25B:
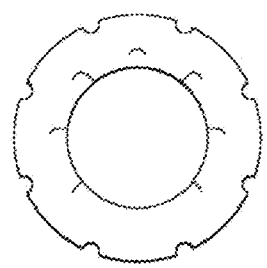
FIG. 25B is a profile view from another side of FIG. 25C.
Figure 25C:
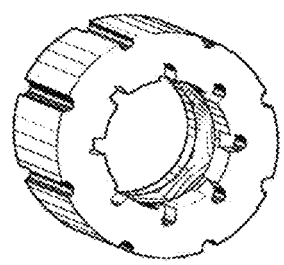
FIG. 25C is a tire that affixes onto the shape that is the steering mechanism FIG. 23A but instead of being in the steering position it operates as a tire rim that affixes to the sphere snap at the end of the pole on FIG. 24A that holds the tire as shown in FIG. 26B and FIG. 27A.
Figure 25D:
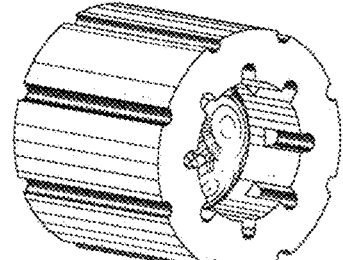
FIG. 25D is another view of FIG. 25C.

FIG. 18 shows the different ways the pole that is FIG. 19 (103, 104, 105) secures the panel pieces (106, 107) into a single piece (108). It performs the role that other similar poles in the Invention perform, however it can be locked in the middle with a smaller pole inserted through the hole in the middle of the pole as shown on FIG. 19B (109).

Figure 4B:
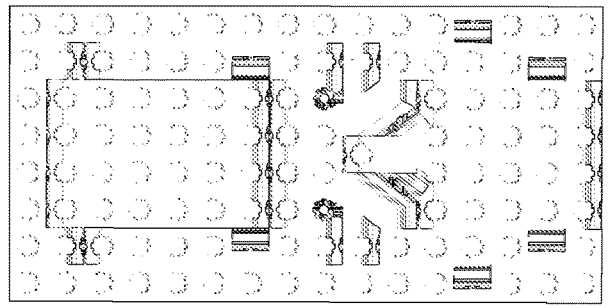
FIGS. 4B, C, D and E are different views of the assembled Invention into a panel that is smooth on one side has holes and curved edges on the other side.
Figure 4C:
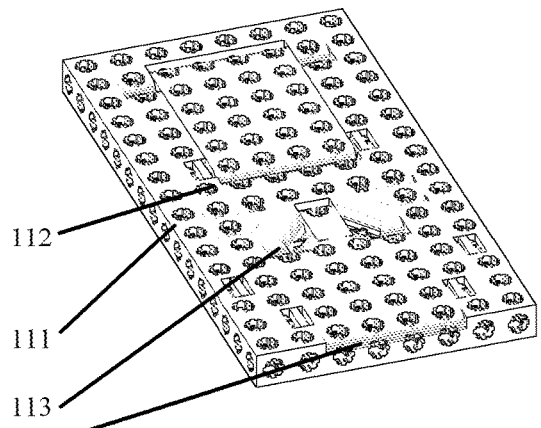
FIG. 4C is another view of FIG. 4B.
Figure 4D:
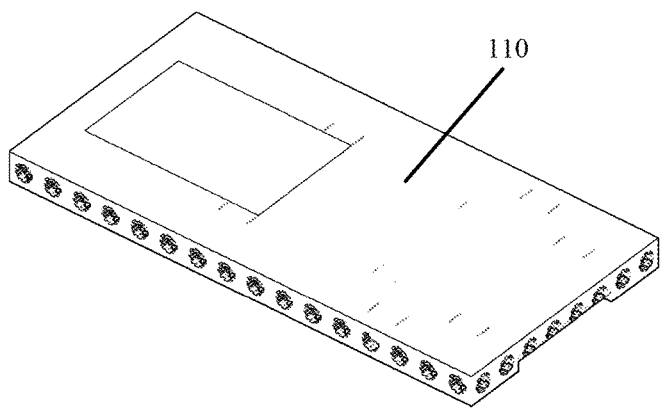
FIG. 4D is another view of FIG. 4B.
Figure 4E:
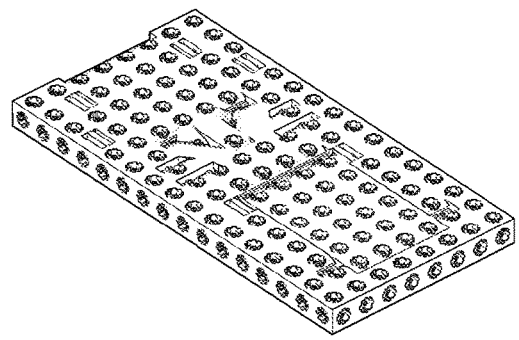
FIG. 4E is another view of FIG. 4B.

FIGS. 4B, C, D and E are different views of the assembled Invention into a panel that is smooth on one side (110) and has holes (111) and curved edges (112, 113, 114) on the other side.

Figure 4F:
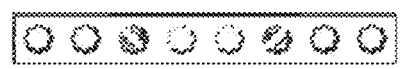
FIG. 4F is a profile view of the assembled Invention when viewed from the narrow side of the panel.

FIG. 4F is a profile view of the assembled Invention when viewed from the narrow side of the panel.

Figure 4G:
FIG. 4G is a profile view of the assembled Invention when viewed from the longer side.

FIG. 4G is a profile view of the assembled Invention when viewed from the longer side.

Figure 4H:
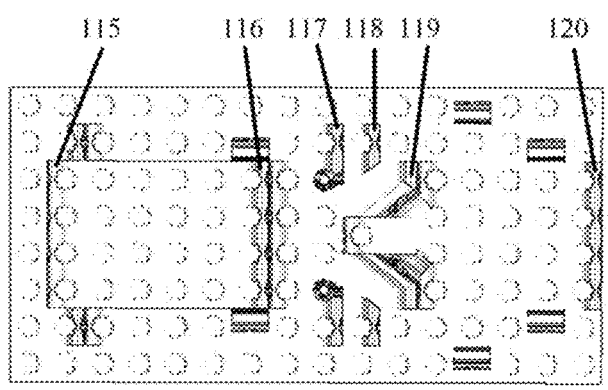
FIG. 4H is an additional view of the panel showing how the curved parts of the side of the panel appear when the Invention is assembled in a flat configuration.
Figure 4I:
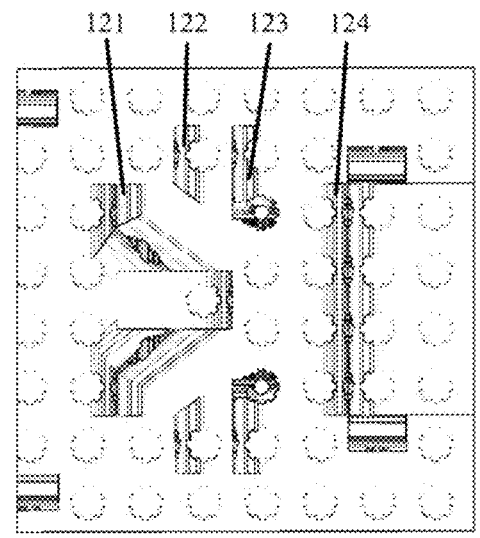
FIG. 4I is an additional view of the panel showing how the curved parts of the side of the panel appear when the Invention is assembled in a flat configuration.

FIGS. 4H and 4I are additional views of the panel showing how the curved parts of the side of the panel (115, 116, 117, 118, 119, 120, 121, 122, 123, 124) appear when the Invention is assembled in a flat configuration.

Figure 4J:
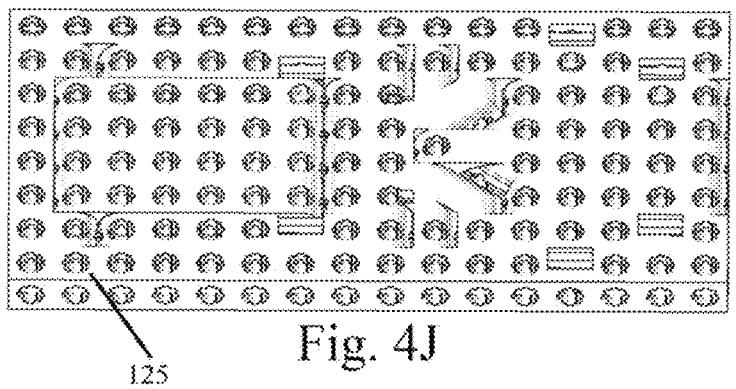
FIG. 4J is another view of the assembled Invention showing the side of the panel with the holes.

FIG. 4J is another view of the assembled Invention showing the side of the panel with the holes (125).

Figure 20A:
FIGS. 20A through N are drawings of different configurations and arrangements into which the Invention can be assembled, built or placed with additional Inventions or Invention pieces.
Figure 20B:
FIG. 20B is an arrangement into which the Invention can be assembled.
Figure 20C:
FIG. 20C is an arrangement into which the Invention can be assembled.
Figure 20D:
FIG. 20D is an arrangement into which the Invention can be assembled.
Figure 20E:
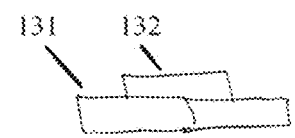
FIG. 20E is an arrangement into which the Invention can be assembled.
Figure 20F:
FIG. 20F is an arrangement into which the Invention can be assembled.
Figure 20G:
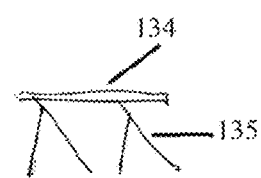
FIG. 20G is an arrangement into which the Invention can be assembled.
Figure 20H:
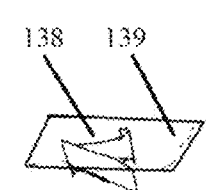
FIG. 20H is an arrangement into which the Invention can be assembled.
Figure 20I:
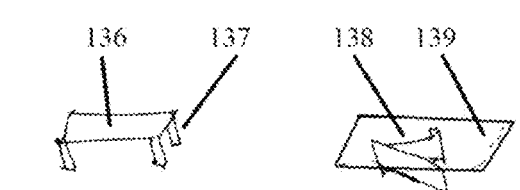
FIG. 20I is an arrangement into which the Invention can be assembled.
Figure 20J:
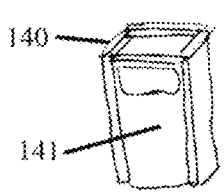
FIG. 20J is an arrangement into which the Invention can be assembled.
Figure 20K:
FIG. 20K is an arrangement into which the Invention can be assembled.
Figure 20L:
FIG. 20L is an arrangement into which the Invention can be assembled.
Figure 20M:
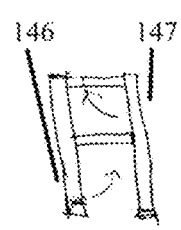
FIG. 20M is an arrangement into which the Invention can be assembled.
Figure 20N:
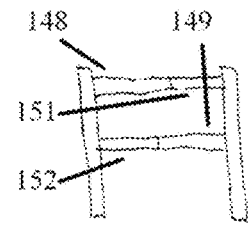

FIGS. 20A through N are drawings of different configurations and arrangements into which the Invention can be assembled, built or placed with additional Inventions or Invention pieces. FIG. 20A shows how the panels can be stacked leaning against each other (126). FIG. 20B shows how the panels can be stacked resting on each other horizontally (127). FIG. 20C shows how the panels can be assembled vertically in a horizontal orientation to build a wall (128). FIG. 20D shows how the panel can be configured into the shape of a chair (129) with a seat (130). FIG. 20E shows how the panels can be stacked to more quickly make a thin fence (131, 132). FIG. 20F shows how the panels can be arranged vertically to make a fence (133). FIG. 20G shows how three panels can form a table where the panels on the bottom (135) open to provide stable support and another panel forms the table top (134). FIG. 20H shows how a single panel can become a small table where the panel is the table top (136) and smaller posts (137) are the legs. FIG. 20I shows how one panel opened and laid sideways (138) supports another panel resting on top (139) to form a low lying table. FIG. 20J shows how panels affixed together in a vertical orientation (140) with one panel having the top inset panel removed to have an opening (141) can be arranged into a garbage container. FIG. 20K shows how two panels can be configured into a stable support for a table wherein the panels are affixed together to provide greater stability (143) and where another panel is the table top (142). FIG. 20L is a demonstration of how a panel can be placed upright in a stable manner with the top subpanel extended out (144) and the lower subpanel also extended out (145), supported by a pole (150). FIG. 20M is a demonstration of how two panels can join to be stable shelves wherein the subpanel on the bottom of the panel on the left swings up to be affixed to the other panel (146). The top subpanel of the other panel swings out to be affixed to the panel on the left (147). FIG. 20N is a demonstration of how two panels can have their long (148, 149) and shorter panels (151, 152) swing out and join with each other to form stable shelves.

FIG. 21 is an object that holds a steering mechanism in its cylindrically hollow center (153). FIG. 21 snaps into the Invention with the sphere snaps that appear on the bottom part of FIG. 21B (154, 155).

FIG. 22 is a mechanism with a comb with teeth (156) that a steering mechanism rests on to turn wheels affixed to the Invention.

FIG. 22D shows a sphere snap (157) on FIG. 22 (158) that snaps into FIG. 24 in the manner shown in FIG. 26A and FIG. 26B.

FIG. 23 is the steering mechanism that fits into FIG. 21 (153) so that, when rotated, it can steer the wheels affixed to the Invention in the configurations shown in FIG. 26A and FIG. 27A.

FIG. 24 is a mechanism that snaps into the sphere snaps (159 160) on the comb that is FIG. 22 with its two female sphere snaps (161, 162) and that also snaps into the wheel and to the Invention's panel in the manner shown in FIGS. 26A (163), 26B (164) and FIG. 27A (165).

FIG. 25 is a tire that affixes onto the shape that is the steering mechanism FIG. 23 but instead of being in the steering position it operates as a tire rim that affixes to the sphere snap at the end of the pole on FIG. 24 that holds the tire as shown in FIG. 26B (166) and FIG. 27A (167).

FIG. 26 demonstrates how the different parts that comprise the Invention's steering mechanism fit together but without showing the panel that is the Invention, for clarity. The steering holder that is FIG. 21 (168), the sphere steering piece that is FIG. 23 (169, 170), the comb with teeth that is FIG. 22 (171), the "T" shaped piece that is FIG. 24 (163) and the tire that is FIG. 25 (172)

FIG. 27 shows how the Invention's steering mechanism (173) fits into the Invention's panel (174). With a steering wheel on a pole inserted into the steering mechanism (175), a person can sit on the panel and steer the tires by turning the pole.

FIG. 28 is a different view of the steering mechanism for clarity.

FIG. 29A shows how the wheels can be affixed to the Invention through the steering mechanism (at the back-left part of the construction at element 175) and how the wheels can be affixed to the Invention without having steering capability (as is shown to the right of the image that is FIG. 29A at element 176).

FIG. 29B is a different view of FIG. 29A for clarity.

FIG. 29C shows how a panel in the Invention can rotate up to form a chair (177) that is locked in place with the poles that lock with teeth on their sides.

FIG. 29D is a different view of the construction that is FIG. 29C.

The invention claimed is:

1. A block system, comprising:
   a plurality of blocks;
   wherein the blocks are comprised of a rectangular "U" shaped block outer block panel piece, the "U"-shaped block outer block panel piece having a first and a second protrusion extending toward a center of the "U"-shaped block outer block panel piece;
   wherein an outside perimeter side of the "U"-shaped block outer block panel piece has a plurality of apertures, each of the apertures having a plurality of teeth therein extending toward a respective center of the respective apertures, and each of the apertures are configured to receive a pole;
   wherein the "U"-shaped block outer block panel piece further has an undulating circular hinge on a perimeter of at least one of the apertures, the respective hinge or hinges being configured to mate with an undulating circular hinge of another block by snapping;
   wherein a second block comprises an "H"-shaped block that fits inside the outer perimeter of the "U"-shaped block outer block panel piece, the "H"-shaped block is configured to secure to the "U"-shaped block outer block panel piece via respective ones of the undulating hinges;
   wherein the blocks further comprise a top panel that is rectangular and that fits into a top open space of the "H"-shaped block and that a top of the top panel has an undulating hinge that affixes to a respective the undulating hinge of the "U"-shaped block outer block panel piece;
   wherein the "U"-shaped block outer block panel piece has a first and a second protruding spherical dimple snap configured to connect to the "H"-shaped block.

2. The modular block system of claim 1, further comprising:
   a steering holder, the steering holder comprising a panel having a concave portion and a convex portion, each of the concave and convex portions having a spherical shape;
   the system further comprising a steering comb comprising a rectangular panel,
   and two "T" shaped tire holders.

* * * * *